US008787963B2

(12) United States Patent
Kurose et al.

(10) Patent No.: US 8,787,963 B2
(45) Date of Patent: Jul. 22, 2014

(54) MOBILE WIRELESS TERMINAL APPARATUS AND BASE STATION SEARCH METHOD

(75) Inventors: Kengo Kurose, Hamura (JP); Yuki Hayashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 115 days.

(21) Appl. No.: 13/245,695

(22) Filed: Sep. 26, 2011

(65) Prior Publication Data

US 2012/0115540 A1 May 10, 2012

(30) Foreign Application Priority Data

Nov. 5, 2010 (JP) ................................. 2010-249148

(51) Int. Cl.
*H04B 7/00* (2006.01)

(52) U.S. Cl.
USPC .............................. 455/525; 455/436; 455/75

(58) Field of Classification Search
CPC ........................... H04W 52/0245; Y02B 60/50
USPC ......................................................... 455/525
See application file for complete search history.

(56) References Cited

U.S. PATENT DOCUMENTS

| | | | |
|---|---|---|---|
| 5,722,070 A * | 2/1998 | Alford ........................... 455/425 |
| 2005/0255847 A1* | 11/2005 | Han et al. ...................... 455/436 |
| 2006/0079232 A1 | 4/2006 | Omori et al. |
| 2006/0089138 A1* | 4/2006 | Smith et al. ................. 455/426.1 |
| 2011/0268005 A1* | 11/2011 | Kurose et al. .................. 370/311 |
| 2011/0300811 A1* | 12/2011 | Minemura et al. .............. 455/75 |
| 2012/0114082 A1* | 5/2012 | Hayashi et al. ................ 375/343 |
| 2012/0184323 A1* | 7/2012 | Hara et al. ..................... 455/525 |
| 2012/0202552 A1* | 8/2012 | Minemura et al. ............. 455/522 |

FOREIGN PATENT DOCUMENTS

| | | |
|---|---|---|
| JP | 2004-112306 A2 | 4/2004 |
| JP | 2005-175932 | 6/2005 |
| JP | 2006-060817 | 3/2006 |
| JP | 2006-093945 | 4/2006 |
| JP | 2006-352660 | 12/2006 |
| JP | 2007-251884 A2 | 9/2007 |
| JP | 2007-336131 | 12/2007 |
| JP | 2008-160861 A2 | 7/2008 |
| JP | 2010-088101 | 4/2010 |

OTHER PUBLICATIONS

Japanese Office Action for Patent Application JP2010-249148 mailed Nov. 29, 2011.

* cited by examiner

*Primary Examiner* — David Bilodeau
(74) *Attorney, Agent, or Firm* — Knobbe, Martens, Olson & Bear LLP

(57) ABSTRACT

According to one embodiment, a mobile wireless terminal apparatus includes a first communication module, a second communication module, and a controller. The first communication module is configured to detect a beacon signal from a wireless signal transmitted from the base station to a service area, and to determine movement into a new service area and movement to an outside of the service area, based on a variation of a reception timing of the beacon signal. The second communication module is configured to receive a wireless signal transmitted from the base station and to communicate with the base station by acquiring identification information of the base station from the wireless signal. The controller is configured to activate the second communication module and cause the second communication module to acquire the identification information, when the movement to the new service area is determined by the first communication module.

7 Claims, 16 Drawing Sheets

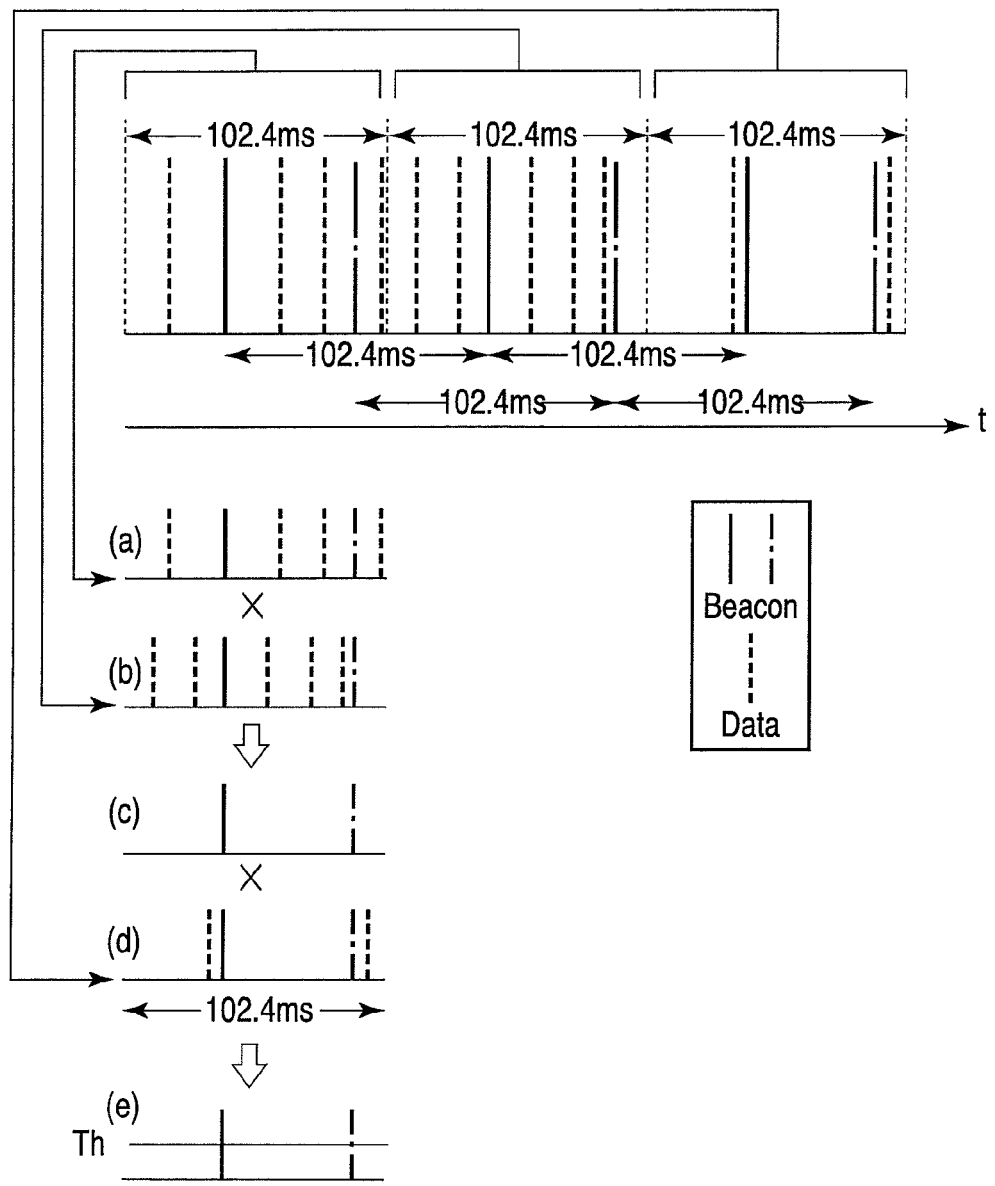
F I G. 6

| Sample number k | Number of necessary memories | Storage cycle (us) | Error relative to 102.4 ms (us) | Number of samples discarded in one search window | Error due to 10 tens of cumulative addition (us) |
|---|---|---|---|---|---|
| 3 | 1118 | 91.55 | 44.04 | 1 | 135.22 |
| 5 | 671 | 152.59 | 13.53 | 0 | 135.3 |
| 7 | 479 | 213.62 | 74.56 | 2 | 135.25 |
| 9 | 372 | 274.66 | 227.15 | 7 | 135.27 |
| 11 | 305 | 335.69 | 13.53 | 0 | 135.3 |
| 13 | 258 | 696.73 | 44.04 | 1 | 135.22 |
F I G. 9
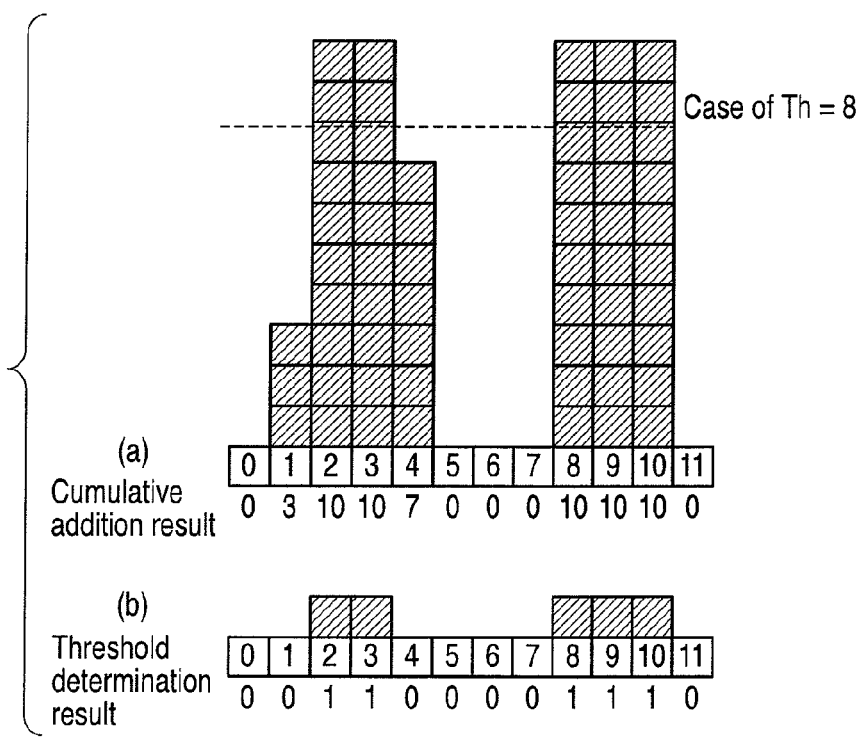
F I G. 10

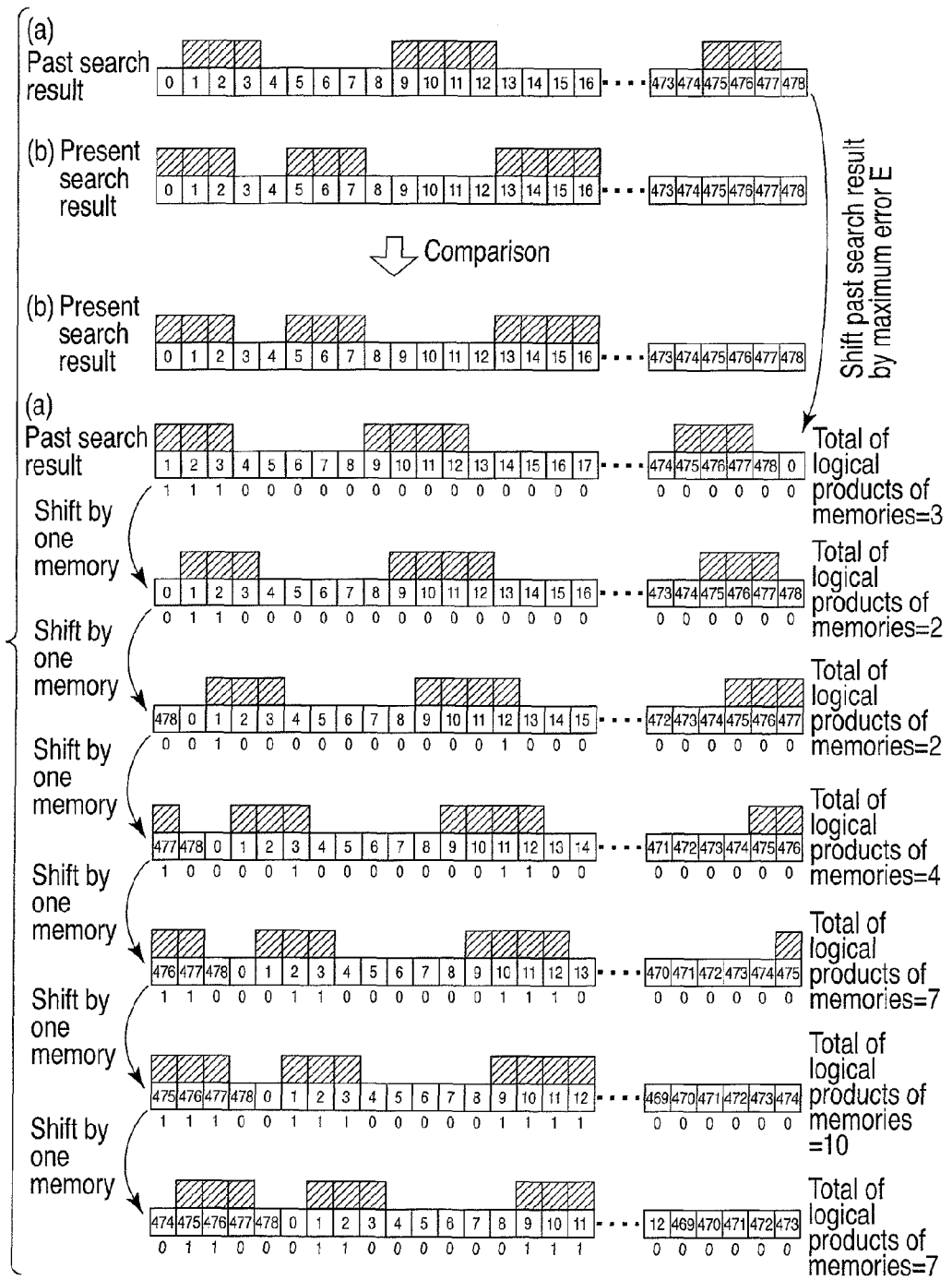
F I G. 1 5

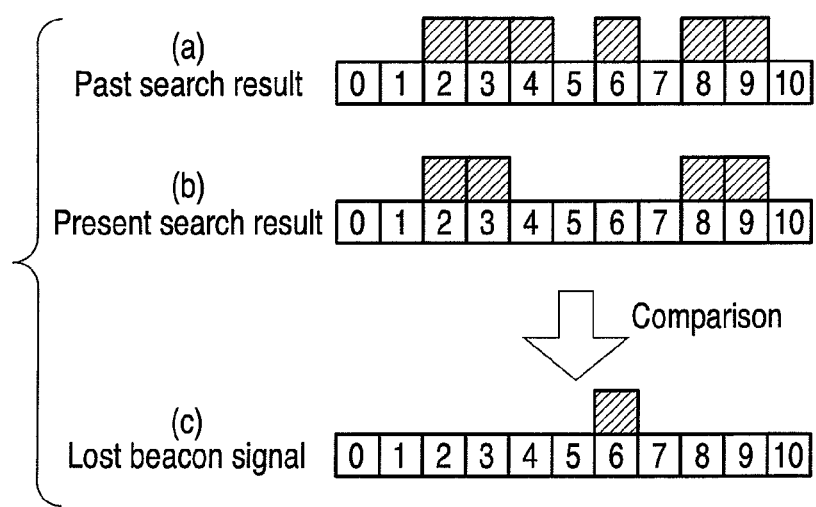
F I G. 16

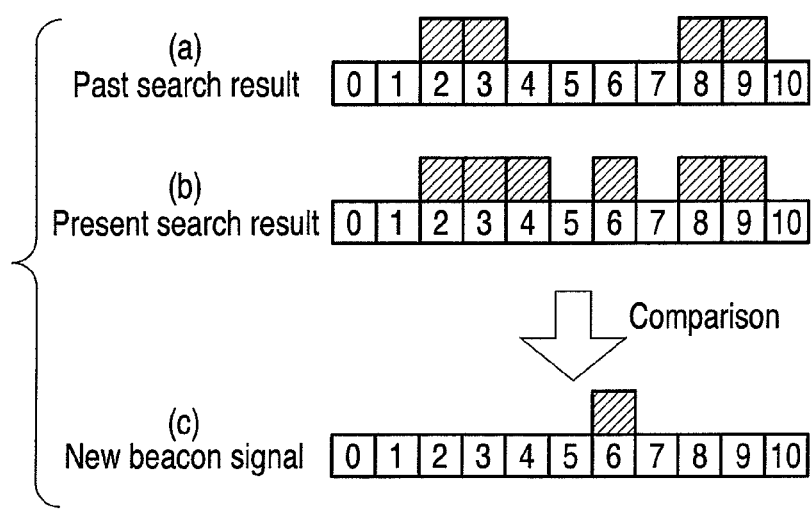
F I G. 19

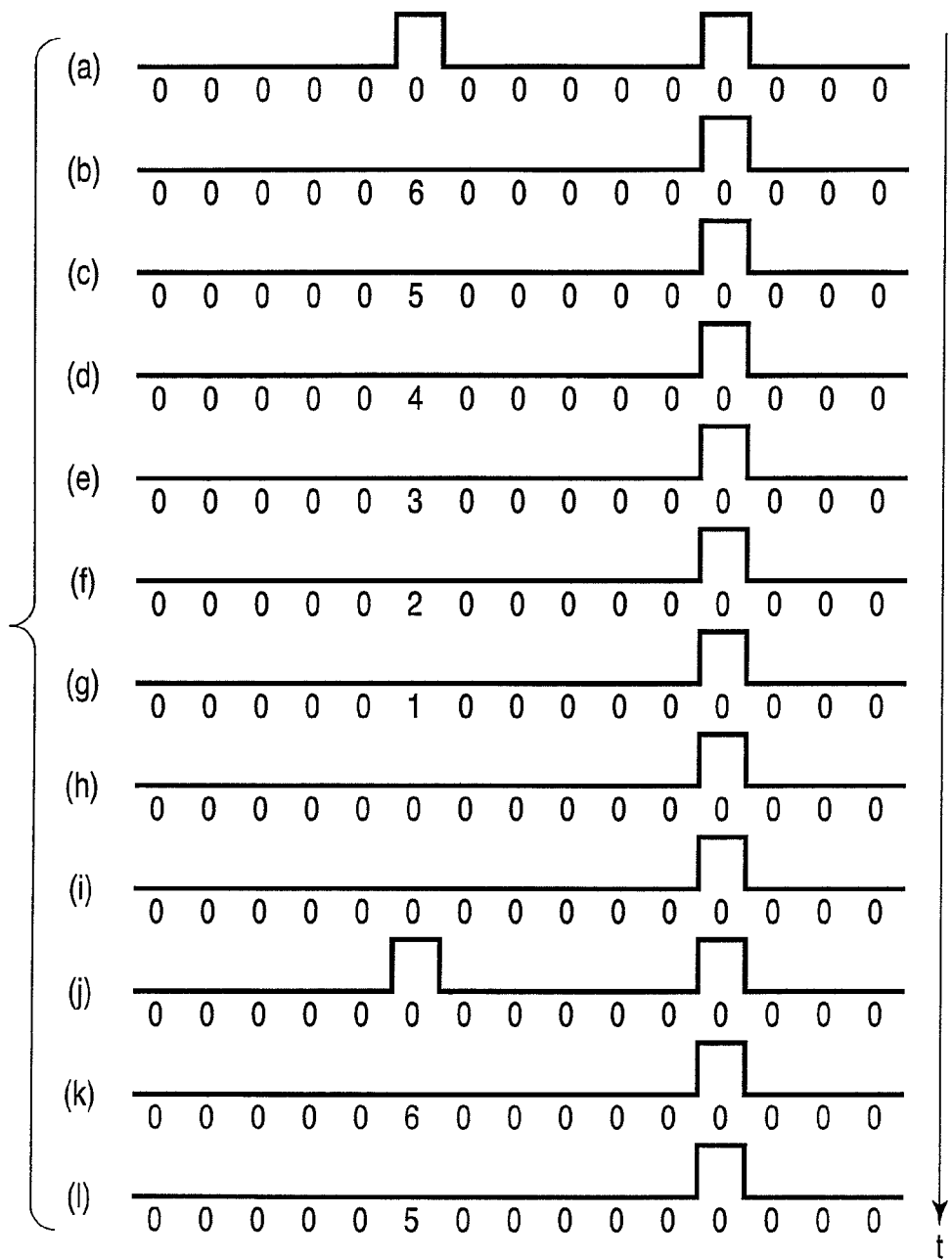
F I G. 20

_US 8,787,963 B2_

MOBILE WIRELESS TERMINAL APPARATUS AND BASE STATION SEARCH METHOD

CROSS-REFERENCE TO RELATED APPLICATIONS

This application is based upon and claims the benefit of priority from prior Japanese Patent Application No. 2010-249148, filed Nov. 5, 2010, the entire contents of which are incorporated herein by reference.

FIELD

Embodiments described herein relate generally to a mobile wireless terminal apparatus which wirelessly communicates with a base station which is accommodated in a network, and a base station search method.

BACKGROUND

As is well known, in a mobile wireless terminal apparatus, it is important to reduce power consumption. A technique for reducing power consumption is also applied to a process of searching for a base station which is accommodated in a network. For example, when the mobile wireless terminal apparatus is outside the service area of the base station, if the base station cannot be detected for a long time, the cycle of search is made longer, thereby lowering the frequency of search and reducing power consumption.

In this conventional method, however, if the cycle of search becomes longer, a delay occurs in detecting that the mobile wireless terminal apparatus has moved into the service area or has moved out of the service area, resulting in degradation in convenience for users.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is an exemplary view for explaining the beacon signal detection process by the low-power-consumption wireless module in the embodiment.

FIG. 9 is an exemplary view for explaining the majority-decision determination by the majority-decision determination module in the embodiment.

FIG. 10 is an exemplary view for explaining threshold determination by a threshold determination module in the embodiment.

FIG. 15 is an exemplary view for explaining compensation of a clock error by a cumulative processing module in the embodiment.

FIG. 16 is an exemplary view for explaining the determination of the loss of beacon signal by a search result comparison module in the embodiment.

FIG. 19 is an exemplary view for explaining the determination of a new beacon signal by the search result comparison module in the embodiment.

FIG. 20 is an exemplary view for explaining the detection of a new beacon signal by the search result comparison module in the embodiment.

DETAILED DESCRIPTION

Various embodiments will be described hereinafter with reference to the accompanying drawings.

In general, according to one embodiment, a mobile wireless terminal apparatus comprises a first communication module, a second communication module, and a controller. The first communication module is configured to detect a beacon signal from a wireless signal transmitted from the base station to a service area, and to determine movement into a new service area and movement to an outside of the service area, based on a variation of a reception timing of the beacon signal. The second communication module is configured to receive a wireless signal transmitted from the base station and to communicate with the base station by acquiring identification information of the base station from the wireless signal, the second communication module being greater in power consumption than the first communication module. The controller is configured to activate the second communication module and cause the second communication module to acquire the identification information, when the movement to the new service area is determined by the first communication module. The first communication module comprises a beacon detection module configured to generate a plurality of reception profiles each indicative of the reception timing of the beacon signal in a search window corresponding to a predetermined cycle, and to detect first and second reception timings of the beacon signal, based on the plurality of the reception profiles, and a comparison module configured to compare a first list in which the first reception timing detected at a first timing is listed and a second list in which the second reception timing detected at a second timing after the first timing is listed, and to determine the movement into the new service area and the movement to the outside of the service area, based on a difference between the first reception timing and the second reception timing.

Figure 1:
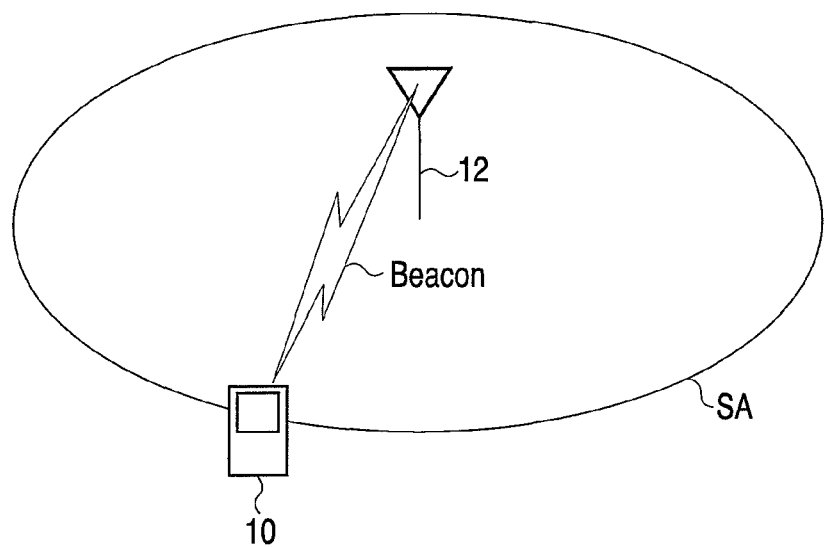
FIG. 1 schematically illustrates a system example in which a mobile wireless terminal apparatus according to an embodiment is used.

FIG. 1 schematically illustrates a Wi-Fi system in which a mobile wireless terminal apparatus 10 according to an embodiment is used. In the Wi-Fi system, a signal called "beacon" (hereinafter referred to as "beacon signal") is transmitted from a base station 12 to a service area SA at predetermined cycles in order to transmit synchronization/annunciation information.

Figure 2:
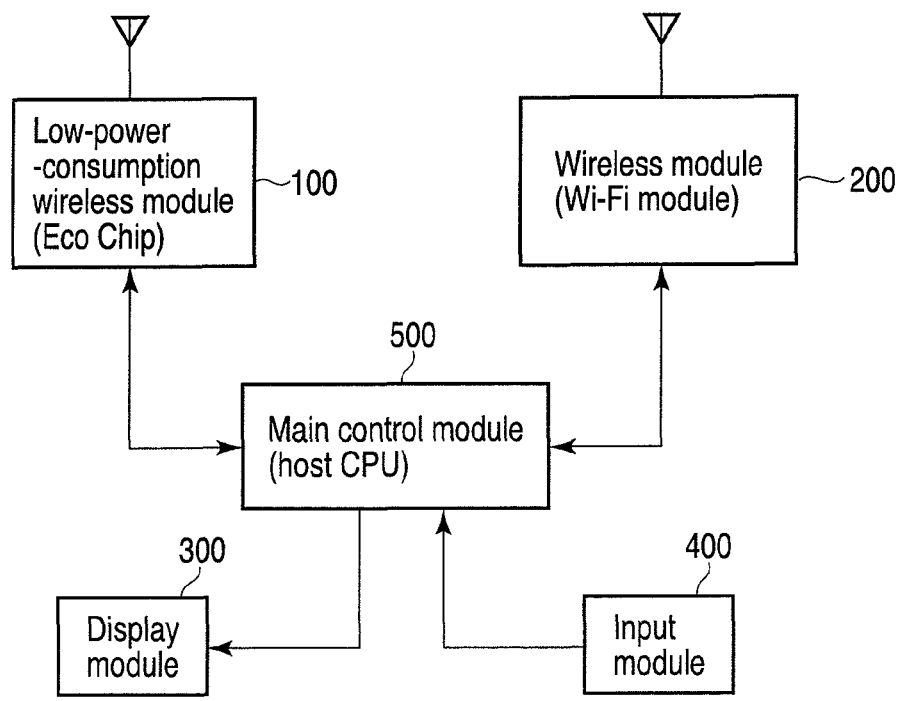
FIG. 2 is an exemplary circuit block diagram illustrating a structure of the mobile wireless terminal apparatus of the embodiment.

FIG. 2 shows a structure of the mobile wireless terminal apparatus 10 according to the embodiment. The mobile wireless terminal apparatus 10 has a function of wirelessly communicating with the base station 12 (wireless LAN access point) which is accommodated in a network. The mobile wireless terminal apparatus 10 comprises, as structural components relating to the wireless communication, a low-power-consumption wireless module 100, a wireless module 200, a display module 300, an input module 400, and a main control module 500 (host CPU). In the description below, the case in which a wireless LAN is adopted as the system of the above-described wireless communication is described by way of example.

The low-power-consumption wireless module 100 is, for example, a low-power-consumption wireless wait IC (Eco Chip) which can detect an area with a low power consumption. By receiving a beacon signal which is cyclically (102.4 ms in this example) transmitted from the base station 12, the low-power-consumption wireless module 100 searches for the base station 12, and manages the base station 12, based on a reception profile of the beacon signal. Specifically, the low-power-consumption wireless module 100 has a function of receiving a wireless LAN signal, monitoring a reception power level and reception timing of a beacon signal in the wireless LAN signal, and, as a result, notifying the main control module 500 that the low-power-consumption wireless module 100 has moved into a service area of a new base station 12 or has moved out of the service area.

In addition, the low-power-consumption wireless module 100 is autonomously operable, even when the main control module 500 is not in operation (halt or hibernate), and has a function of activating the main control module 500 which is not in operation.

Figure 3:
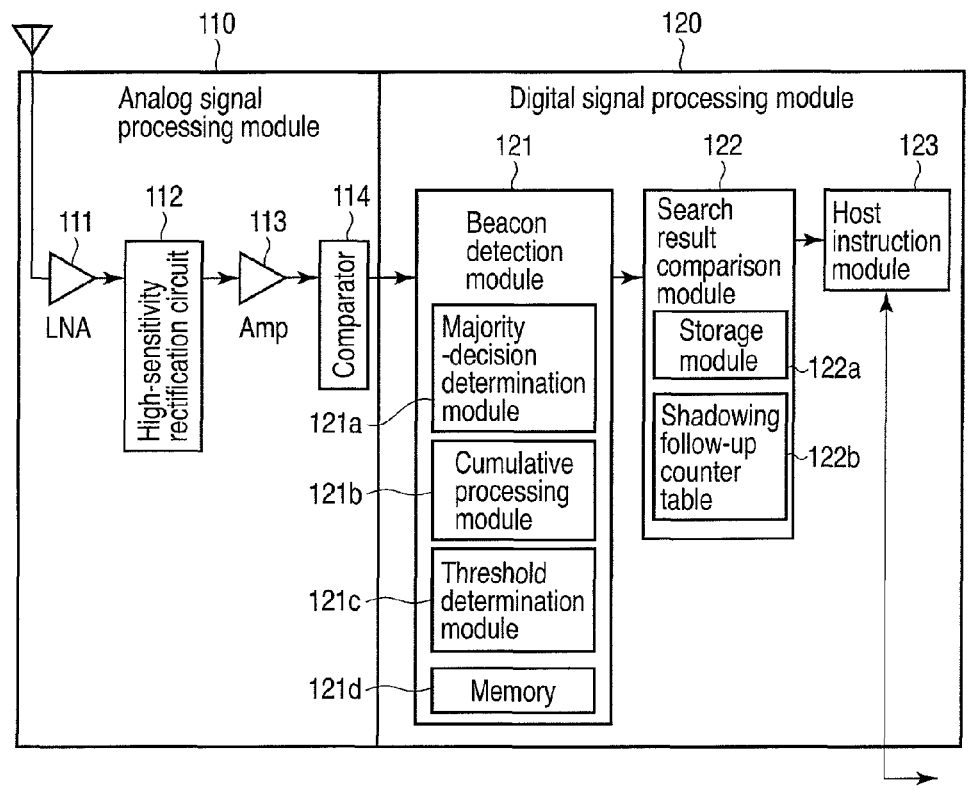
FIG. 3 is an exemplary circuit block diagram illustrating a structure of a low-power-consumption wireless module of the mobile wireless terminal apparatus of the embodiment.

FIG. 3 shows a structure example of the low-power-consumption wireless module 100. The low-power-consumption wireless module 100 comprises an analog signal processing module 110 and a digital signal processing module 120. The analog signal processing module 110 comprises a low-noise amplifier (LNA) 111, a high-sensitivity rectification circuit 112, a baseband signal amplifier 113 and a comparator 114. The digital signal processing module 120 comprises a beacon detection module 121, a search result comparison module 122 and a host instruction module 123.

The low-noise amplifier (LNA) 111 amplifies a wireless LAN signal which has been received from the base station, and outputs it to the high-sensitivity rectification circuit 112. It is assumed that the maximum reception sensitivity of the wireless LAN signal, which has been received from the base station, is equal to the sensitivity of the wireless module 200, and the gain of the low-noise amplifier 111 is set so that this wireless signal may match with the high-sensitivity rectification circuit 112 of the rear stage.

In order to realize low power consumption, the high-sensitivity rectification circuit 112 does not include a local oscillator at RF frequencies. The high-sensitivity rectification circuit 112 includes, for example, a clock-form bias application type rectification circuit, and down-converts an output of the low-noise amplifier 111 to a baseband signal.

The baseband signal amplifier 113 comprises, for example, a current mirror circuit and an I-V conversion circuit (current/voltage conversion circuit), and amplifies an output of the high-sensitivity rectification circuit 112.

Figure 4:
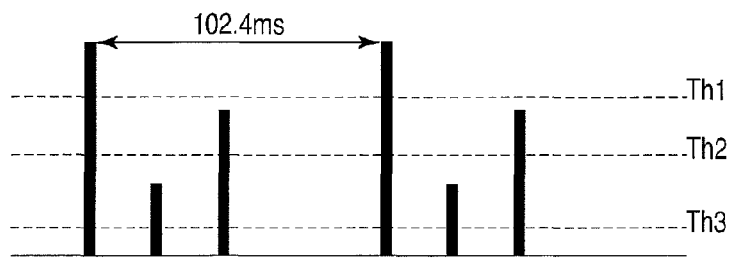
FIG. 4 is an exemplary view for explaining the operation of a comparator of the low-power-consumption wireless module in the embodiment.

In the comparator 114, for example, as shown in FIG. 4, a plurality of thresholds (Th1, Th2 and Th3) can be set. However, in order that all beacons can be detected, a low threshold, for instance, Th3, is set. At this time, the gains of the low-noise amplifier 111 and baseband signal amplifier 113 are set at the maximum. The comparator 114 determines the output of the baseband signal amplifier 113 at the set threshold at predetermined cycles. Specifically, when the output of the baseband signal amplifier 113 exceeds the threshold, an H level signal (level High) is output. When the output of the baseband signal amplifier 113 does not exceed the threshold, an L level signal (level 0) is output.

Using the beacon transmission cycle (102.4 ms) of the base station as a search window, the beacon detection module 121 detects, from the output of the comparator 114, a reception timing of a signal which is highly possibly a beacon signal. As functions for achieving this, the beacon detection module 121 comprises a majority-decision determination module 121a, a cumulative processing module 121b and a threshold determination module 121c.

Figure 5:
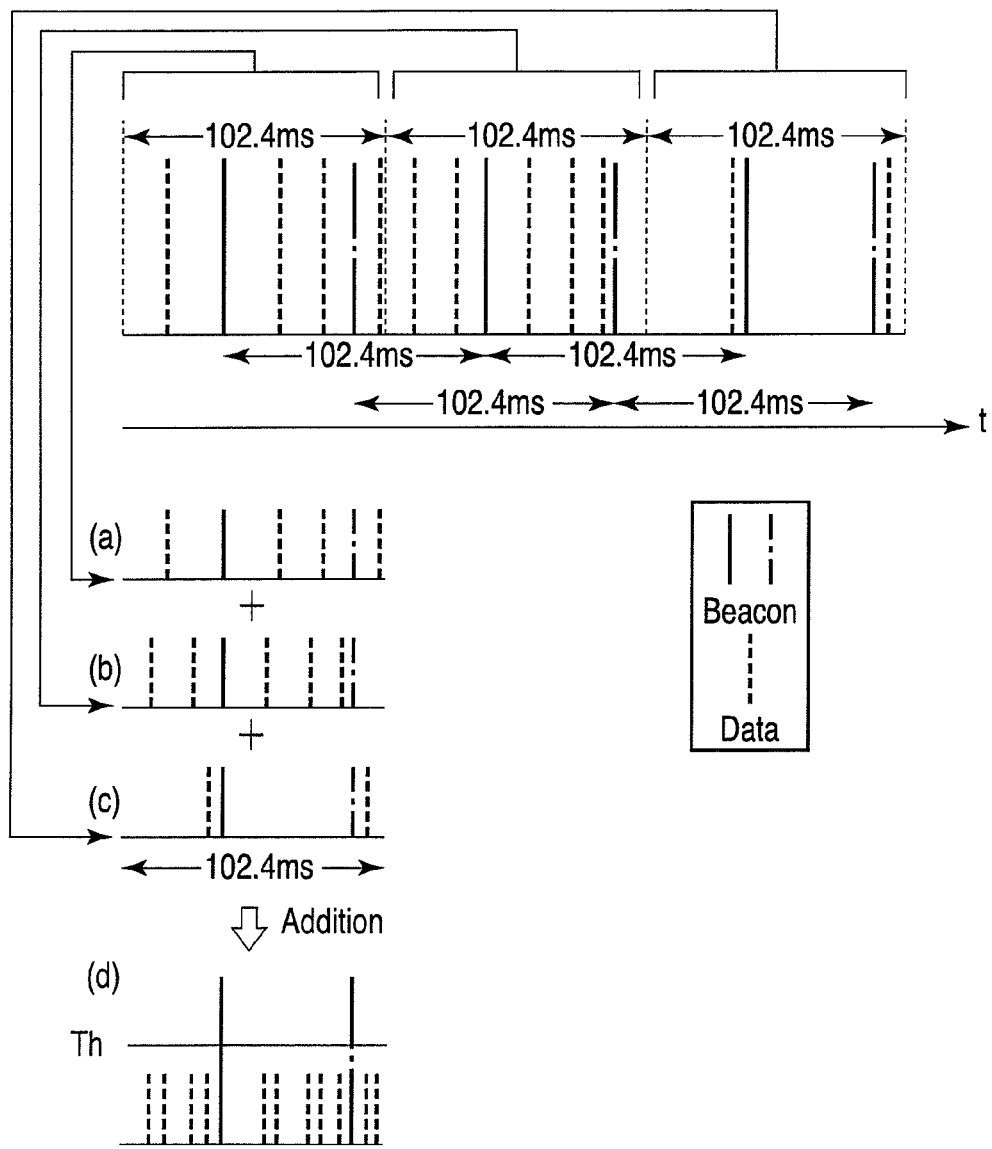
FIG. 5 is an exemplary view for explaining a beacon signal detection process by the low-power-consumption wireless module in the embodiment.

Specifically, as shown in FIG. 5, using the search window of search width 102.4 ms as one reception profile, the beacon detection module 121 overlaps a plurality of reception profiles (a) to (c) on a time axis, and adds wireless LAN signals which are received at the same timing. This signal process serves as a time filter. Thus, only beacon signals, which are transmitted at the same cycle as the search window, appear at the same position and are added. Interference waves, which occur at random, are suppressed relative to the beacon signal, and a reception profile (d) is obtained. In addition, since a data signal has burst properties, the possibility is low that the data signal is present at the same cycle as the search window, and the data signal, unlike the beacon signal, is not largely cumulatively added. A signal exceeding the threshold Th is detected as a beacon signal, from the cumulatively added reception profile (d), and the reception timing of the signal is output to the search result comparison module 122.

FIG. 6 shows a method other than the method shown in FIG. 5 in which a beacon signal is made conspicuous by adding a plurality of reception profiles. In the method shown in FIG. 6, a correlation between successive search windows is calculated. In this method, a logical product of outputs of the comparator 114 at the same timing of temporally successive reception profiles is calculated, thereby obtaining only such signals as to have H levels successively at the same timing, that is, signals which are highly possibly beacon signals.

Specifically, as regards a reception profile (a) and a reception profile (b), a logical product of wireless LAN signals, which correspond on the time axis, is calculated, and thereby a profile logical product (c) is obtained. Then, as regards the profile (c) and reception profile (d), a logical product of wireless LAN signals, which correspond on the time axis, is calculated, and thereby a profile logical product (e) is obtained. A wireless LAN signal of the threshold level Th or above, which appears in the profile logical product (e), is regarded as a beacon signal.

The threshold level Th may be controlled by the low-power-consumption wireless module 100 in accordance with the number of samples (number of cumulative additions) which is used in the process in FIG. 4. In addition, the threshold level Th may be determined in consideration of the influence due to a displacement of the reception timing of the beacon. Specifically, in the environment of a high traffic in which an error of the reception timing frequently occurs, the threshold level Th is decreased, and in other cases the threshold level Th is relatively increased.

Next, the process illustrated in FIG. 5 and FIG. 6 is described more concretely.

Figure 7:
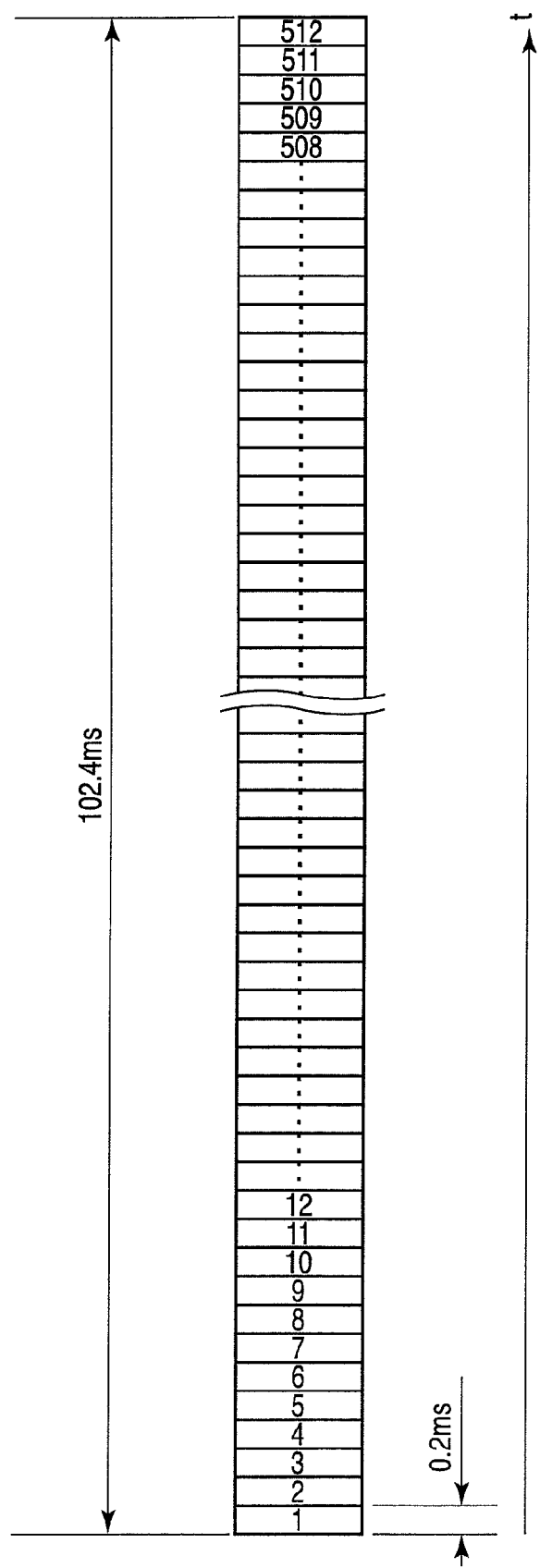
FIG. 7 is an exemplary view for explaining a process on a search window in the embodiment.

If the search window is set at 102.4 ms and the sampling cycle is set at, e.g. 200 μm, as described above, 512 positions are present in the search window, as shown in FIG. 7. In this case, the beacon detection module 121 includes 512 memory areas (hereinafter referred to as "memories 121d") corresponding to the respective positions. Using the memories 121d, the beacon detection module 121 executes cumulative addition in the case of FIG. 5 and executes logical product calculation in the case of FIG. 6, successively with respect to the positions from position 1 to position 512.

In general, an oscillator for general uses of a clock frequency of 32,768 kHz is widely used. The case of using this oscillator will now be considered. If the clock frequency is 32.768 kHz, many positions, i.e. 3355 positions, are present in the search window of 102.4 ms, and many memories 121d are needed.

Figure 8:
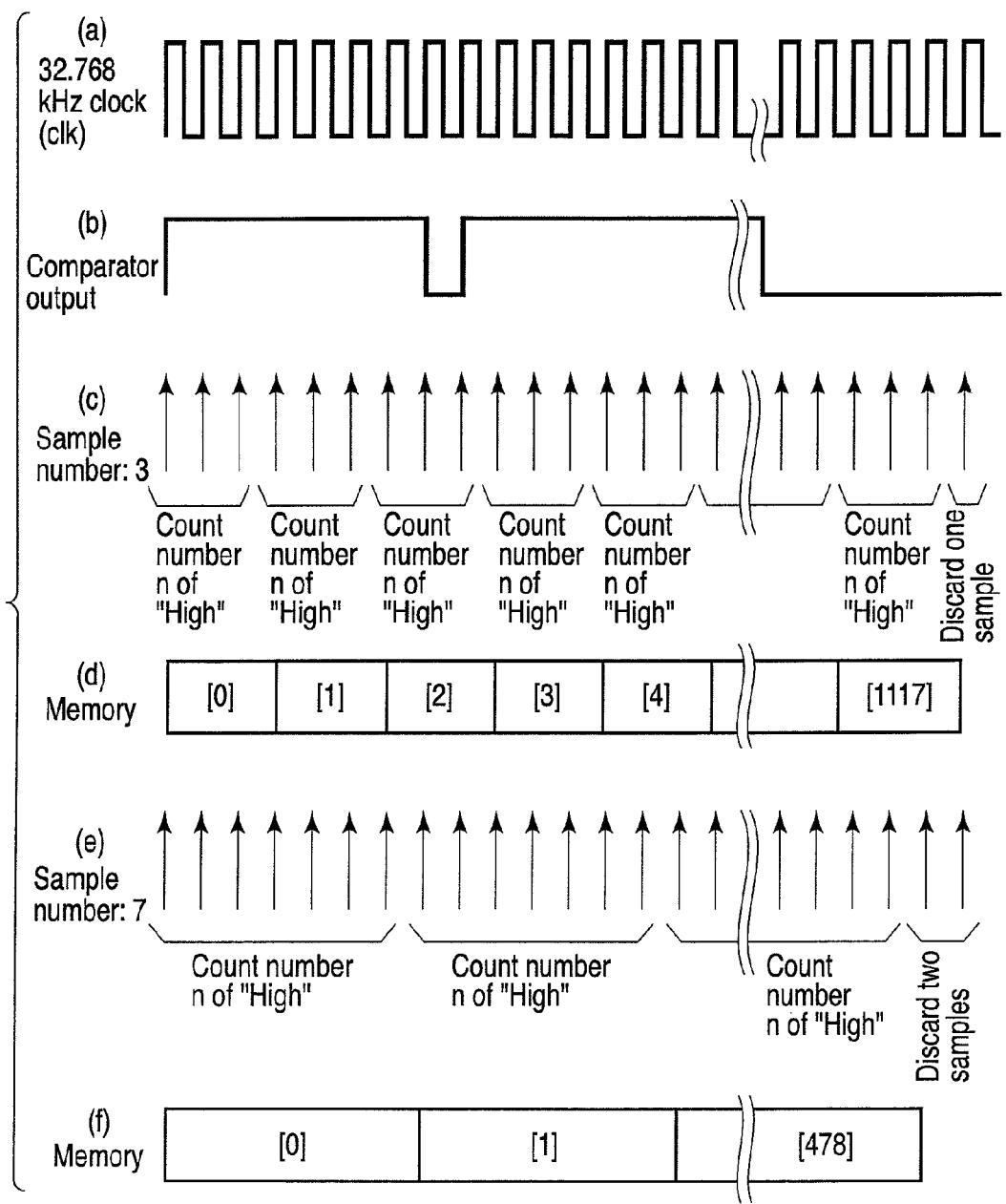
FIG. 8 is an exemplary view for explaining majority-decision determination by a majority-decision determination module in the embodiment.

The majority-decision termination module 121a samples the output of the comparator 114 at 32,768 kHz, and executes majority-decision determination with respect to every k samples. Thereby, one level determination result in a period corresponding to the k samples is output, and all the 3355 samples can be compressed to 1/k. Thus, the number of necessary memories 121d can be set at 3355/k. FIG. 8 shows examples of k=3 and k=7 m.

The comparator output (part (b) of FIG. 8) is sampled with the clock of 32,768 kHz (part (a) of FIG. 8). For example, as shown in part (c) of FIG. 8, the majority-decision determination module 121a executes majority-decision determination by setting k=3. Then, as shown in part (d) of FIG. 8, the number of necessary memories 121d becomes 1118. In addition, if majority-decision determination is executed by setting k=7 m (part (e) of FIG. 8), the number of necessary memories 121d becomes 479, as shown in part (f) of FIG. 8. FIG. 9 shows the value of k, the number of necessary memories 121d, the cycle of storage, the memory storage error between the cycle of 102.4 ms and the memory capacity that is used, the number of samples (excess samples) which are discarded in one search window, and the error in the case of executing cumulative addition ten times.

If the majority-decision determination module 121a completes the majority-decision determination of every k samples of one search window, i.e. all 3355 positions, the majority-decision determination module 121a repeatedly executes the same process for the samples of the respective positions of a search window following the processed search window.

The value of k may be dynamically varied, where necessary. For example, when the quality of reception (SN ratio) is low, control is executed to increase the value of k. In addition, by multiplying the sampling frequency (32,768 kHz) by k, the same result as shown in FIG. 9 is obtained.

The cumulative processing module 121b accumulates determination results, which are obtained by the majority-decision determination module 121a, in the 3355/k memories 121d. In the example shown in FIG. 5, as described above, the result of (d) is obtained from the results of (a), (b) and (c), and the result of (d) is stored in the memory 121d. On the other hand, in the example shown in FIG. 6, a logical product of determination results (a), (b) and (d), which are obtained by the majority-decision determination module 121a, is calculated, and the result (e) is stored in the memory 121d.

The accumulation process (the process of FIG. 5 or FIG. 6) by the cumulative processing module 121b may be executed after a position displacement due to the clock error is corrected. In addition, in order to secure the clock precision, the number of times of sampling for accumulation may be limited to a predetermined number. Specifically, the memory 121d is cleared at every predetermined number of times of sampling. Thereby, the accumulation of clock errors is prevented. Further, this accumulation process may be executed intermittently, and the power consumption by the low-power-consumption wireless module 100 may be suppressed.

The threshold determination module 121c executes threshold determination with respect to the result (part (d) in FIG. 5 or part (e) in FIG. 6) obtained by the accumulation process, and detects a signal, which has been accumulated up to the threshold or more, as a beacon signal, thereby detecting the reception timing of the beacon signal. In particular, when the cumulative addition method, as shown in part (d) of FIG. 5, is adopted, the positions (reception timings) corresponding to memories 121d, which store information (part (b) of FIG. 10) that has been cumulatively added up to the threshold or more, among cumulatively added information pieces (part (a) of FIG. 10), are detected as timings at which the beacon signal has been received, as shown in detail in FIG. 10.

The threshold determination module 121c regards successive positions, among positions at which cumulative results of the threshold or more are obtained, as a single identical beacon signal. Specifically, successive positions are regarded and detected as a reception timing of one beacon signal.

The search result comparison module 122 comprises a storage module 122a and a shadowing follow-up counter table 122b. The storage module 122a creates and stores a past search result storage list L1 and a present search result storage list L2. The past search result storage list L1 is a list of reception timings which were detected by the beacon detection module 121 in the past. The present search result storage list L2 is a list of the latest reception timings detected by the beacon detection module 121. Based on the past search result storage list L1 and present search result storage list L2, the search result comparison module 122 detects that the mobile wireless terminal apparatus 10 has moved to a service area of a new base station 12 or has moved out of the service area of the base station 12. The shadowing follow-up counter table 122b is a table in which a count value is set when the loss of a beacon signal is detected, thereby to recognize the time of loss of the beacon signal. The count value is decremented if the beacon signal remains lost each time a search is conducted.

The search result comparison module 122 compares the search results after compensating the memory storage error and clock error shown in FIG. 9. The details will be described later.

The host instruction module 123 delivers an instruction to the main control module 500, based on a detection result of the search result comparison module 122.

The wireless module 200 is a so-called Wi-Fi module which executes wireless LAN communication with the base station 12. The operation of the wireless module 200 is controlled by an instruction from the main control module 500. The wireless module 200 has a function of down-converting and decoding a received wireless signal and acquiring data, and a function of transmitting data (encoding, modulation, wireless transmission). Compared to the low-power-consumption wireless module 100, the power consumption of the wireless module 200 is higher.

The display module 300 displays visual information, such as text and images, to the user. The display module 300 is composed by using a display device such as an LCD (Liquid Crystal Display).

The input module 400 is an input interface using a plurality of key switches and a touch panel, and accepts a request from the user.

The main control module 500 executes overall control of the respective components of the mobile wireless terminal apparatus 10. The main control module 500 has a function of supplying power to the low-power-consumption wireless module 100 and the power consumption of the wireless module 200, and a function of controlling the operations thereof. Even in the state in which the main control module 500 is in the inoperative state (halt or hibernate), the main control module 500 can supply power to the low-power-consumption wireless module 100, and can operate the low-power-consumption wireless module 100. In addition, the main control module 500 can be activated from the inoperative state (halt or hibernate) by the control of the low-power-consumption wireless module 100.

In the above-described example, the cooperation between the low-power-consumption wireless module 100 and the wireless module 200 is executed via the main control module 500. Alternatively, the function of the main control module 500, in particular, may be provided in the low-power-consumption wireless module 100 or the wireless module 200, and thereby the low-power-consumption wireless module 100 and the wireless module 200 can be configured to directly cooperate with each other, without the intervention of the main control module 500.

Figure 11:
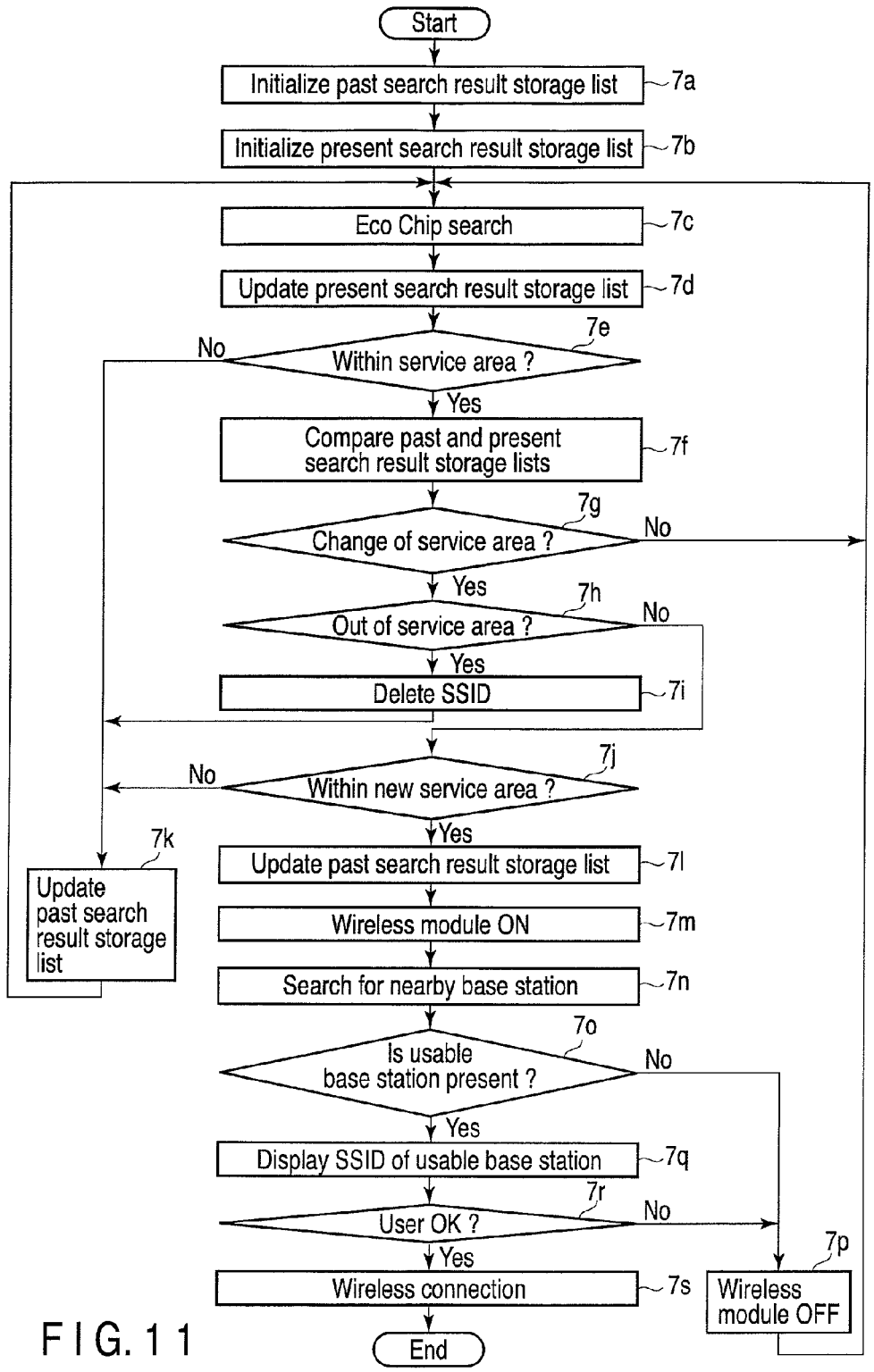
FIG. 11 is an exemplary flow chart illustrating an operation at a wait time of the mobile wireless terminal apparatus in the embodiment.

Next, the operation of the mobile wireless terminal apparatus 10 having the above-described structure is described. In the description below, in particular, a description is given of the operation up to the search for the base station 12 and the establishment of wireless connection at the wait time. FIG. 11 is a flow chart for describing this operation. FIG. 11 illustrates a process which is executed by the low-power-consumption wireless module 100, the wireless module 200 and the main control module 500. This process is executed by the acceptance of an instruction from the main control module 500 by the low-power-consumption wireless module 100. In the description below, the case in which the sampling frequency for the comparator 114 is 32,768 kHz is described by way of example.

Figure 12:
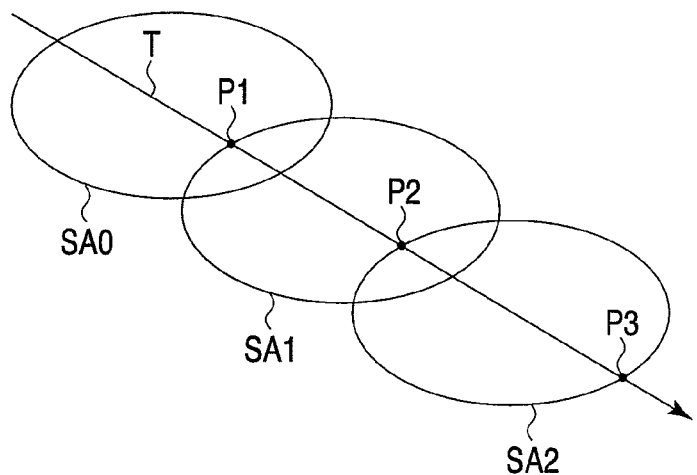
FIG. 12 is an exemplary view illustrating a state in which the mobile wireless terminal apparatus of the embodiment passes through a plurality of service areas SA0 to SA2 along a locus T.

FIG. 12 illustrates a state in which the mobile wireless terminal apparatus 10 passes through a plurality of service areas SA0 to SA2 along a locus T. In FIG. 12, the service areas SA0 to SA2 partly overlap. The mobile wireless terminal apparatus 10 monitors, by the low-power-consumption wireless module 100, the reception power level and reception timing of the beacon signal which is transmitted from the base station 12 in each service area, and can detect that the mobile wireless terminal apparatus 10 has moved to a new service area at, for example, point P1 or P2. In the service areas SA0 to SA2, the mobile wireless terminal apparatus 10 can detect, by the wireless module 200, an SSID (Service Set Identifier) from the base station 12 of each area, and can display the SSID.

In addition, the mobile wireless terminal apparatus 10 can detect, by the low-power-consumption wireless module 100, that the beacon signal has been lost, and that the mobile wireless terminal apparatus 10 has moved out of the service area at point P3. If the mobile wireless terminal apparatus 10 detects that the mobile wireless terminal apparatus 10 has moved out of the service area, the mobile wireless terminal apparatus 10 can delete, at this point, the display of the SSID of the service area SA2 which has been displayed until that time.

Even while the process illustrated in FIG. 11 is being executed, if a connection request is issued from the user via the input module 400, the main control module 500 controls the wireless module 200, and detects SSIDs of connectable base stations 12. Further, the main control module 500 detects, among the connectable base stations 12, a usable base station 12 with the best reception condition, or a base station 12 designated by the user, establishes wireless connection to this base station 12, and starts communication. For example, this process is executed in block 7s (to be described later).

While the low-power-consumption wireless module 100 is executing the process illustrated in FIG. 11, the main control module 500 may, in some case, transit to the inoperative state (halt state or hibernate state). For example, if a user operation through the input module 400 is not executed and the wait time has continued for a predetermined time or more, the low-power-consumption wireless module 100 starts the above-described process and, on the other hand, the main control module 500 transitions to the inoperative state (halt state or hibernate state). However, the main control module 500 may monitor a user request via the input module 400, and may restore the operation state from the halt state or hibernate state to the normal operative state in accordance with the user request.

To start with, in block 7a, the low-power-consumption wireless module 100 (search result comparison module 122) initializes the past search result storage list L1 which is stored in the storage module 122a, and advances to block 7b.

In block 7b, the low-power-consumption wireless module 100 (search result comparison module 122) initializes the present search result storage list L2 which is stored in the storage module 122a, and advances to block 7c.

In block 7c, the low-power-consumption wireless module 100 (analog signal processing module 110 and beacon detection module 121) receives a wireless LAN signal which is transmitted from the base station 12, searches for the base station 12 (beacon signal), and advances to block 7d.

To be more specific, the majority-decision determination module 121a samples the output of the comparator 114, executes majority-decision determination with respect to every k samples, and executes level determination in the associated period. Thereby, results of level determination with respect to 3355/k positions are obtained, and the results are stored in the corresponding memories 121d.

Subsequently, the cumulative processing module 121b executes the accumulation process as illustrated in FIG. 5 or FIG. 6. Thereby, the results of the accumulation process are stored in the 3355/k memories 121d.

Then, the threshold determination module 121c executes threshold determination with respect to the results ((d) in FIG. 5 or (e) in FIG. 6) obtained by the accumulation process, and detects a signal, which has been accumulated up to the threshold or more, as a beacon signal, thereby detecting the reception timing of the beacon signal.

In the meantime, the threshold determination module 121c regards successive positions, among positions at which cumulative results of the threshold or more are obtained, to be the position of a single identical beacon signal. Specifically, the threshold determination module 121c generates a reception profile in which a plurality of successive positions are regarded as the reception timing of a single beacon signal.

In block 7d, the low-power-consumption wireless module 100 (search result comparison module 122) updates the present search result storage list L2 by the reception profile ((d) in FIG. 5 or (e) in FIG. 6) which has been calculated in block 7c, and advances to block 7e. Thereby, the present search result storage list L2 stores the reception timing of the signal indicated by the reception profile ((d) in FIG. 5 or (e) in FIG. 6). At this time, in order to reduce the power consumption due to the circuit scale, the number of received beacons may be stored.

In block 7e, the low-power-consumption wireless module 100 (search result comparison module 122) refers to the reception profile ((d) in FIG. 5 or (e) in FIG. 6) and determines whether there is a signal which is possibly a beacon signal exceeding a preset threshold level Th, thereby determining whether the mobile wireless terminal apparatus 10 is located within the service area which is formed by the base station 12. When it is determined that the mobile wireless terminal apparatus 10 is located within the service area, the process advances to block 7f. On the other hand, if it is determined that the mobile wireless terminal apparatus 10 is out of the service area, the process advances to block 7k.

In the meantime, in consideration of the influence of shadowing (to be described later), even after the beacon signal has been lost, the search result comparison module 122 does not immediately determine, within a predetermined time period, that the mobile wireless terminal apparatus 10 is out of the service area (see a lost beacon signal detection process P1 to be described later).

Figure 13:
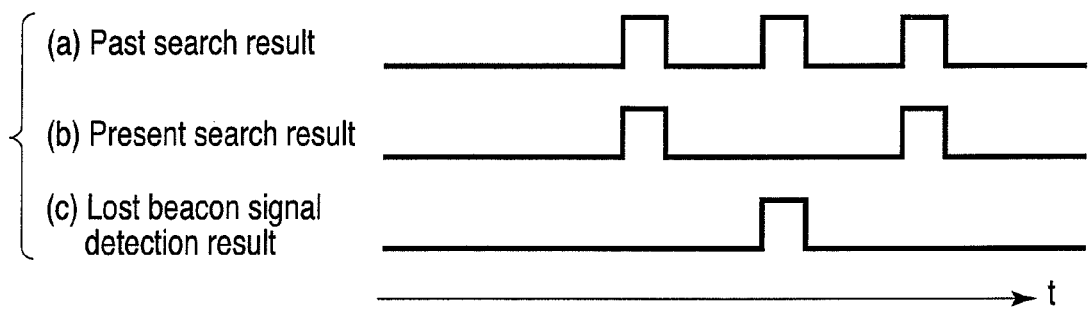
FIG. 13 is an exemplary view for explaining the process of block 7f in the embodiment.
Figure 14:
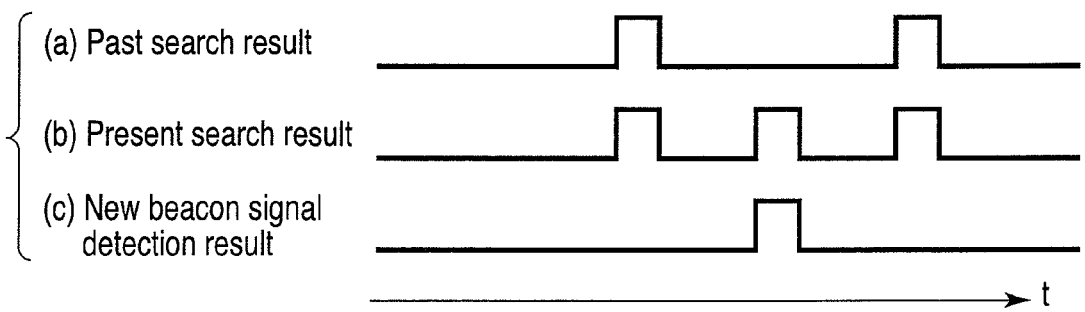
FIG. 14 is an exemplary view for explaining the process of block 7f in the embodiment.

In block 7f, the low-power-consumption wireless module 100 (search result comparison module 122) compares the past search result storage list L1 and present search result storage list L2, and advances to block 7g. For example, as shown in parts (a) and (b) of FIG. 13 or parts (a) and (b) of FIG. 14, the low-power-consumption wireless module 100 (search result comparison module 122) compares beacon detection positions in the search window, that is, beacon reception timings, in the past search result storage list L1 and present search result storage list L2. At this time, as has been described above, not the beacon positions (reception timings) but the numbers of beacons may be compared. In the example of the past search result in part (a) of FIG. 13 and the present search result in part (b) of FIG. 13, by comparing both results, a lost beacon signal can be detected as shown in part (c) of FIG. 13. In the example of the past search result in part (a) of FIG. 14 and the present search result in part (b) of FIG. 14, by comparing both results, a new beacon signal can be detected as shown in part (c) of FIG. 14.

To be more specific, an algorithm of the comparison process by the search result comparison module 122 is described. To begin with, the search result comparison module 122 compensates the memory storage error (sampling timing error) and clock error shown in FIG. 9. A description is given below with reference to FIG. 15. In order to compensate the errors, the search result comparison module 122 executes the following process.

The search result comparison module 122 first shifts the reception profile (hereinafter referred to as "past reception profile", (a) in FIG. 15), which is based on the past search result storage list L1 stored in the storage module 122a, by a pre-estimated maximum error E to a position at which the reception timing is carried forward. Then, the search result comparison module 122 compares the shifted past reception profile and the reception profile (hereinafter referred to as "present reception profile", (b) in FIG. 15) which is based on the present search result storage list L2 stored in the storage module 122a, and calculates a logical product of both reception profiles as a correlation value C1. The maximum error E is a value which is determined by a maximum error estimated from the frequency error of the 32,768 kHz clock and the memory storage error shown in FIG. 9.

Then, the search result comparison module 122 shifts the past reception profile to a position at which the reception timing is delayed by a timing T (T=about 30 µs×k) corresponding to one memory, and compares the shifted past reception profile and the present reception profile, thereby calculating a correlation value Cn. This process is repeated N (=E/T) times, and correlation values C1 to CN are obtained.

The search result comparison module 122 compares a past reception profile, by which the maximum correlation value Cn is obtained, with the present reception profile. In this manner, by cyclically shifting the reception timing of the past reception profile, the search result comparison module 122 calculates a correlation between the past reception profile and the present reception profile. The search result comparison module 122 compares the past reception profile with a highest correlation to the present reception profile, among the cyclically shifted past reception profiles, and the present reception profile, thereby compensating the error of the position of the beacon. In short, even when there is an error in beacon position between the present reception profile and the past reception profile, the mobile wireless terminal apparatus 10 can detect a new beacon and a lost beacon.

Although FIG. 9 shows only the memory storage error (sampling timing error) and the clock error, errors may occur due to factors such as the kind of beacon, the variation of the message amount included in the beacon, and the variation of the beacon transmission timing due to a carrier sense result. By executing the above-described process, the search result comparison module 122 can also compensate such errors.

Next, the detection process is concretely described. The detection process includes a lost beacon signal detection process P1 for detecting a lost beacon signal, and a new beacon signal detection process P2 for detecting a new beacon signal.

(Lost Beacon Signal Detection Process P1)

Referring to FIG. 16, an algorithm of the lost beacon signal detection process P1 is described. Part (a) of FIG. 16 shows a reception timing based on the past search result storage list L1, and part (b) of FIG. 16 shows a reception timing based on the present search result storage list L2.

In the case where a position at which a beacon signal is present is indicated by "1" and a position at which a beacon signal is absent is indicated by "0" in the past search result storage list L1 and the present search result storage list L2, it is determined that there is no lost beacon, when a past search result is "1" indicative of the presence of a beacon signal and a present search result is also "1", or when a past search result is "0" indicative of the absence of a beacon signal and a present search result is also "0". When a past search result is "1" indicative of the presence of a beacon signal and a present search result is "0", it is determined that there is a lost beacon.

The search result comparison module 122 compares the past search result storage list L1 and the present search result storage list L2, which are shown in parts (a) and (b) of FIG. 16, and detects that beacon signals are lost at a fourth position and a sixth position (part (c) of FIG. 16). However, since the beacon signal of the fourth position neighbors a beacon signal of a third position, it is possible that the beacon signal of the fourth position was temporarily detected at the timing of part (a) of FIG. 16 due to fluctuation, or that the beacon signal of the fourth position is temporarily lost at the timing of part (b) of FIG. 16 due to fluctuation, and therefore the beacon signal of the fourth position is not regarded as being lost. Specifically, when beacon signals at successive positions of the past search result and present search result are compared and even one memory is commonly "1" in both the past search result and present search result, these signals are determined to be the same beacon signal and are not regarded as a lost signal. On the other hand, since the beacon signal of the sixth position has no neighboring beacon, this beacon signal is detected as being lost.

In the example of parts (a) to (c) of FIG. 16, the number of storage memories of beacons signals is equal between the past search and the present search. However, there are cases in which the number of storage memories of beacon signals or the detection positions of beacon signals are different due to factors such as the memory storage error (sampling timing error), the clock error, the kind of beacon, the variation of the message amount included in the beacon, and the variation of the beacon transmission timing due to a carrier sense result. In consideration of these factors of errors, the search result comparison module 122 in the present embodiment can detect and determine a lost beacon signal in the following manner.

Specifically, in the lost beacon position detection by the comparison between the past search result storage list L1 and the present search result storage list L2, when the past search result is "1" and the present search result is "0", the search result comparison module 122 regards the beacon at the position of comparison as a lost beacon. However, if the case is assumed in which the error amount between the past search and present search is within one memory, when both the past search result and present search result are "1" in the range of the error within one memory, the beacon at the position of comparison may not be regarded as a lost beacon.

If the case is assumed in which the error amount between the past search and present search is two memories or more, for example, when there is one or more memory positions where both the present search result and past search result are "1" and the search result is successively "1" at the memory positions, all beacons may be regarded as the same beacon and may not be regarded as a lost beacon.

The search result comparison module 122 sets a count value N (e.g. N=6) at a position at which a beacon signal is lost (hereinafter referred to as "loss position") by using the shadowing follow-up counter table 122b, and executes such management that even if a new beacon signal occurs within a predetermined time, the occurrence of such a new beacon signal is not regarded as the occurrence of a new beacon signal.

Specifically, if an obstacle, such as a person or an object, is present between the mobile wireless terminal apparatus 10 and the base station 12, the same beacon signal may be detected or may not be detected at the same position of the search window. This is the influence of shadowing, owing to which the beacon signal from the base station 12 cannot temporarily be received. In consideration of the influence of shadowing, if the new/lost beacon is detected by the above-described simple comparison of respective search results, the wireless module 200 with high power consumption would be frequently activated and the base station would be searched unnecessarily.

Thus, the search result comparison module 122 is provided with a memory like a search window used in cumulative addition, and this memory is used as the shadowing follow-up counter table 122b. A count value of, e.g. 6 is set at a position where a lost beacon has been detected. If the lost beacon remains lost at each time of a search, the count value is decremented, and the time of loss of the lost beacon can be recognized. If the count value corresponding to the position at which a lost beacon has been detected is greater than a preset threshold, the search result comparison module 122 initializes the count value corresponding to this position (i.e. a default value "0" is set, and the count value "6" is set in the next search), and resumes decrement at each search.

A concrete description is given below. In block 7f, the search result comparison module 122 sets a count value "6" at a loss position of the shadowing follow-up counter table 122b. Parts (a) to (l) of FIG. 17 and parts (a) to (l) of FIG. 18 show examples of a transition of search results.

It is now assumed that a threshold "3" is set for the count value of the shadowing follow-up counter table 122b. Specifically, when a lost beacon signal has been detected before the count value is changed from 3 to 2, the count value at the position of the detection of the lost beacon signal is initialized.

Figure 17:
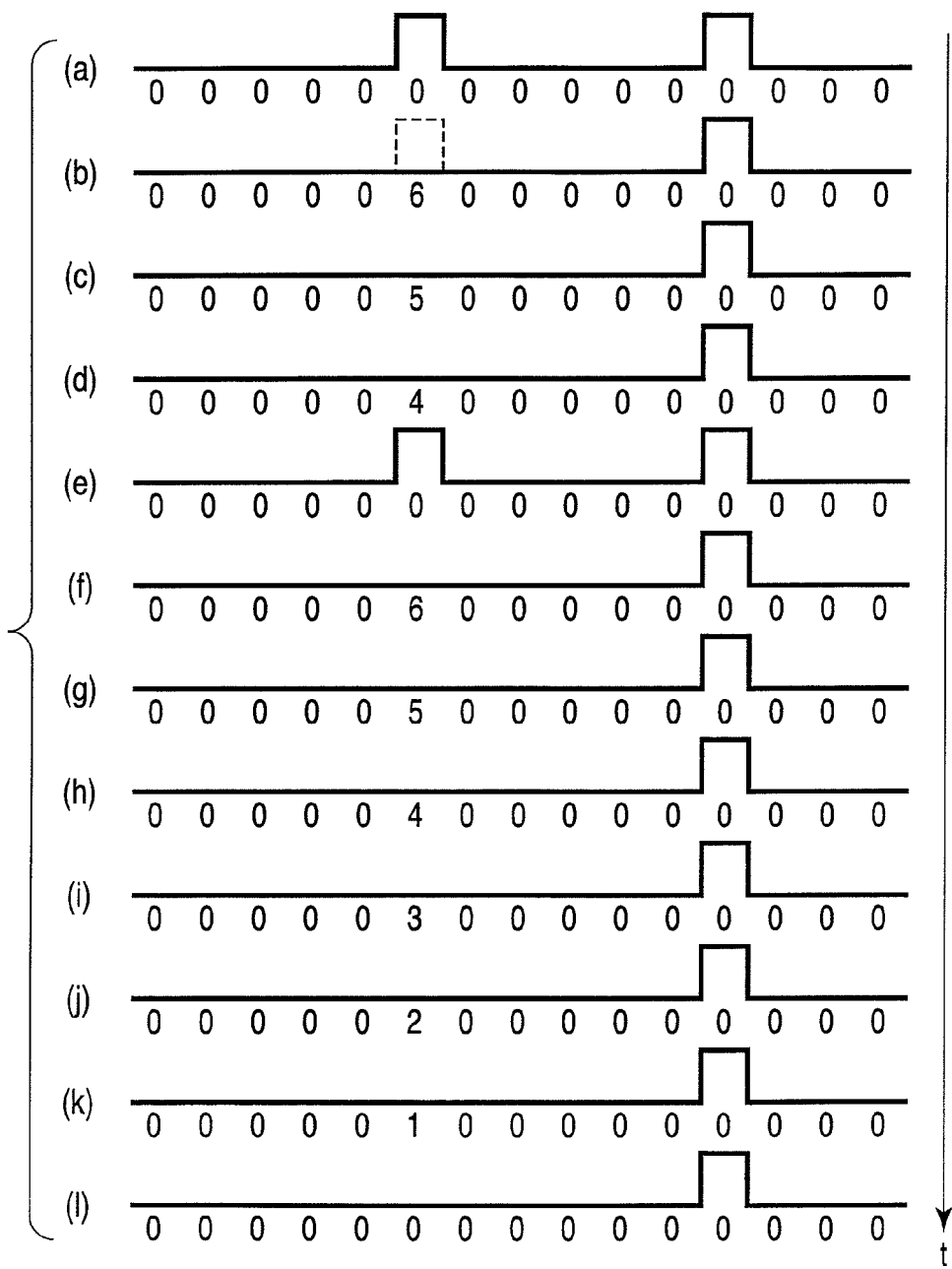
FIG. 17 is an exemplary view for explaining the management of a lost beacon signal by the search result comparison module in the embodiment.
Figure 18:
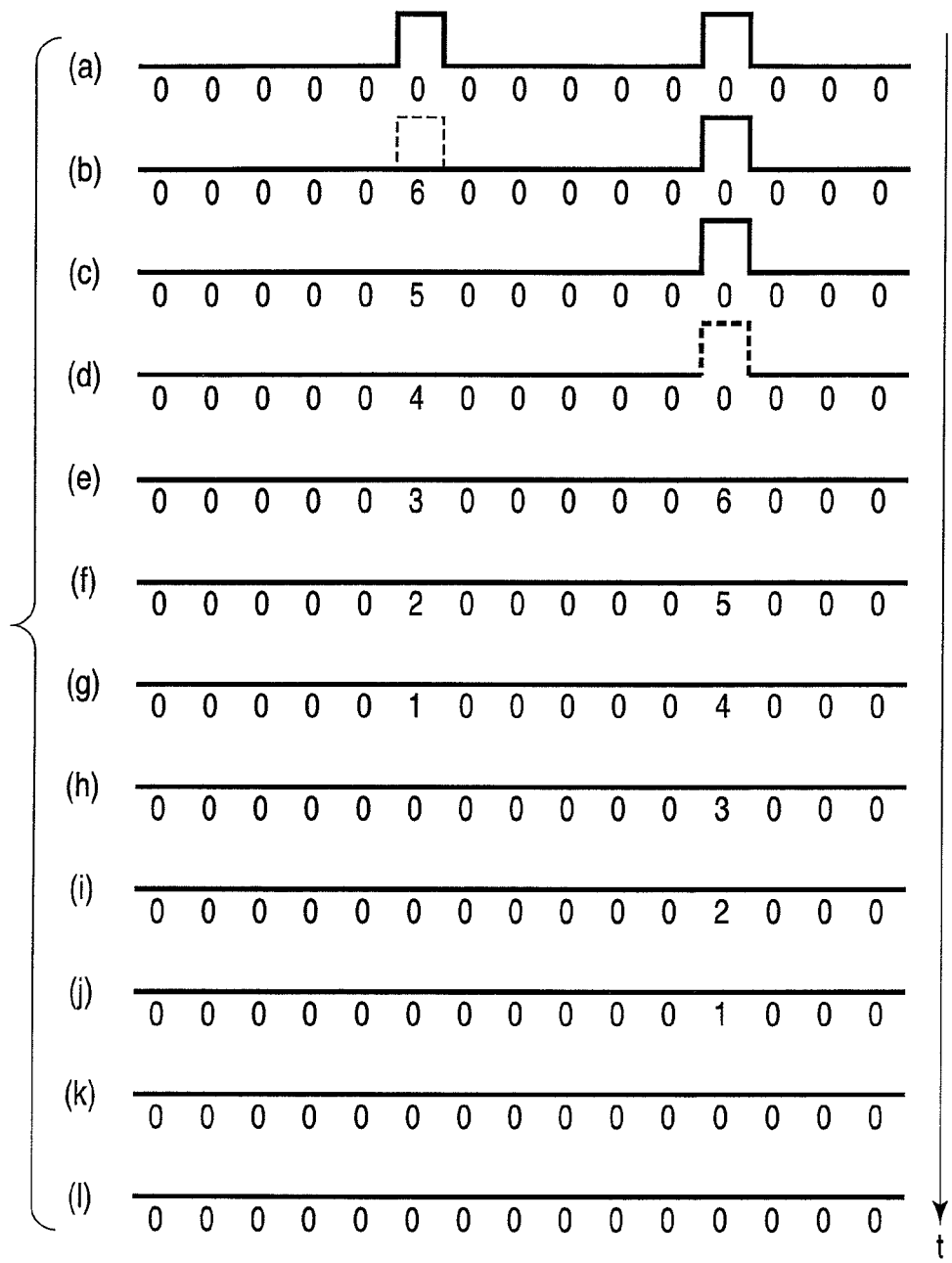
FIG. 18 is an exemplary view for explaining the management of the lost beacon signal by the search result comparison module in the embodiment.

Part (a) of FIG. 17 shows that beacon signals have been detected at two positions. When the reception condition of part (a) of FIG. 17 has transitioned to the reception condition of part (b) of FIG. 17, that is, when it is determined that the beacon signal, which has been detected at the left-side position, is lost, the search result comparison module 122 sets a count value "6" at the loss position. It is assumed that a count value "0" is preset at the other positions.

In a search illustrated in part (c) of FIG. 17, since the beacon signal remains lost at the loss position, the search result comparison module 122 decrements the count value "6" of this position to "5". Similarly, in a search illustrated in part (d) of FIG. 17, since the beacon signal remains lost at the loss position, the search result comparison module 122 decrements the count value "5" of this position to "4".

In a subsequent search illustrated in part (e) of FIG. 17, a beacon signal is detected at the loss position. At this time, the counter value is "4" which is greater than the preset threshold "3" (in the case where "4" is changed to "3"). Thus, since the beacon signal has been detected once again at the same position when the count value is other than "0", the search result comparison module 122 regards this beacon signal as being identical to the previously detected lost beacon signal, and initializes the count value of this position to "0".

Subsequently, as shown in parts (f) to (l) of FIG. 17, when the beacon signal, which was detected at the left-side position, remains lost, the count value is decremented.

Parts (a) to (l) of FIG. 18 show an example in which after all beacon signals are lost, the respective count values are decremented to 0, and thereby it is determined that the mobile wireless terminal apparatus 10 has moved out of the service area.

Part (a) of FIG. 18 shows that beacon signals have been detected at two positions. When the reception condition of part (a) of FIG. 18 has transitioned to the reception condition of part (b) of FIG. 18, that is, when it is determined that the beacon signal, which has been detected at the left-side position, is lost, the search result comparison module 122 sets a count value "6" at the loss position. Subsequently, as shown in parts (c) to (h) of FIG. 18, when the beacon signal remains lost at the position where the beacon signal was lost, the count value is decremented to "0".

On the other hand, as shown in part (d) of FIG. 18, when it is determined that the beacon signal, which has been detected at the right-side position, is lost, the search result comparison module 122 similarly sets a count value "6" at the loss position. Subsequently, as shown in parts (e) to (k) of FIG. 18, when the beacon signal remains lost at the position where the beacon signal was lost, the count value is decremented to "0".

In this manner, if the search result comparison module 122 determines, based on the count values of the shadowing follow-up counter table 122b, that all beacons signals have been lost, the search result comparison module 122 notifies the host instruction module 123. Specifically, since the count values corresponding to all beacon signals have been decremented to "0", the search result comparison module 122 can detect that the mobile wireless terminal apparatus 10 has moved out of the service area.

Thus, in block 7f, the count value is set at the position ("loss position") at which the lost beacon signal is detected. Even if the beacon signal is detected once again before the count value is counted to the preset threshold, it is possible to prevent the wireless module 200 from being activated. Therefore, even if such a situation occurs that the beacon signal temporarily fails to be detected due to the influence of shadowing, it is possible to prevent the wireless module 200 from being frequently activated each time. In addition, by determining that all counter values of the shadowing follow-up counter table 122b have been decremented to "0", the search result comparison module 122 can detect that the mobile wireless terminal apparatus 10 has moved out of the service area.

In the above description, the value of the preset threshold is "3". However, the value of the preset threshold is optimized in consideration of the cycle of the search operation, and the mode of use and the environment of use of the mobile wireless terminal apparatus 10. For example, when the mobile wireless terminal apparatus 10 is configured to be portable, since the movement in the service area is easy, it is possible that the same beacon signal is received at the same timing in another area. Thus, by setting the threshold at a relatively high value, the wireless module 200 can be activated with high responsivity. In the case where the mobile wireless terminal apparatus 10 is mounted on a stationary apparatus such as a personal computer, or when the cycle of the search operation is long, the threshold is set at a low value in order to reduce the influence of shadowing.

The search result comparison module 122 may optimize and presets the threshold for the shadowing follow-up counter table 122b, and may execute the process for the loss of the beacon signal, based on the condition of any one of the case where the count value has been changed from 0 to 6 (no countermeasure to shadowing), the case where the count value has been changed from 6 to 5, the case where the count value has been changed from 5 to 4, the case where the count value has been changed from 4 to 3, the case where the count value has been changed from 3 to 2, the case where the count value has been changed from 2 to 1, and the case where the count value has been changed from 1 to 0. Thereby, the influence of shadowing can be reduced and the movement to the outside of the service area can be detected.

There are cases in which the number of storage memories of beacon signals or the timings are different between respective searches, due to the above-described sampling timing or clock error, the kind of beacon, the variation of the message amount included in the beacon, and the variation of the beacon transmission timing due to a carrier sense result. As a result, there may occur a case in which the memory number/position, at which the count value is set by the shadowing follow-up counter table 122b, differs between the past search and the present search, and such a case is assumed that the position, whose count value is to be initialized in accordance with the detection of a beacon signal, becomes unclear. In this case, like the above-described detection of the new/lost beacon signal, if the position of the shadowing follow-up counter table 122b, at which a count value other than 0 is set, and the position, at which a new beacon signal has been detected, overlaps even partly, the signals at these positions may be regarded as the same beacon signal, and all associated count values may be initialized.

(New Beacon Signal Detection Process P2).

Referring to FIG. 19, an algorithm of the new beacon signal detection process P2 is described. Part (a) of FIG. 19 shows a reception timing based on the past search result storage list L1, and part (b) of FIG. 19 shows a reception timing based on the present search result storage list L2.

In the case where a position at which a beacon signal is present is indicated by "1" and a position at which a beacon signal is absent is indicated by "0" in the past search result storage list L1 and the present search result storage list L2, it is determined that there is no lost beacon, when a past search result is "1" indicative of the presence of a beacon signal and a present search result is also "1", or when a past search result is "0" indicative of the absence of a beacon signal and a present search result is also "0". When a past search result is "0" indicative of the absence of a beacon signal and a present search result is "1", it is determined that there is a new beacon.

The search result comparison module 122 compares the past search result storage list L1 and the present search result storage list L2, which are shown in parts (a) and (b) of FIG. 19, and detects that new beacon signals are present at a fourth position and a sixth position (part (c) of FIG. 19). However, since the beacon signal of the fourth position neighbors a beacon signal of a third position, it is possible that the beacon signal of the fourth position was temporarily lost at the timing of part (a) of FIG. 19 due to fluctuation, or that the beacon signal of the fourth position is temporarily detected at the timing of part (b) of FIG. 19 due to fluctuation, and therefore the beacon signal of the fourth position is not regarded as a new beacon signal. On the other hand, since the beacon signal of the sixth position has no neighboring beacon, this beacon signal is detected as a new beacon signal.

In the example of parts (a) to (c) of FIG. 19, the number of storage memories of beacons signals is equal between the past search and the present search. However, there are cases in which the number of storage memories of beacon signals or the detection positions of beacon signals are different due to factors such as the memory storage error (sampling timing error), the clock error, the kind of beacon, the variation of the message amount included in the beacon, and the variation of the beacon transmission timing due to a carrier sense result. In consideration of these factors of errors, the search result comparison module 122 in the present embodiment can detect and determine a new beacon signal in the following manner.

Specifically, in the new beacon position detection by the comparison between the past search result storage list L1 and the present search result storage list L2, when the past search result is "0" and the present search result is "1", the search result comparison module 122 regards the beacon at the position of comparison as a new beacon. However, if the case is assumed in which the error amount between the past search and present search is within one memory, when both the past search result and present search result are "1" in the range of the error within one memory, the beacon at the position of comparison may not be regarded as a new beacon.

If the case is assumed in which the error amount between the past search and present search is two memories or more, for example, when there is one or more memory positions where both the present search result and past search result are "1" and the search result is successively "1" at the memory positions, all beacons may be regarded as the same beacon and may not be regarded as a new beacon.

Like the above-described lost beacon signal detection process P1, the search result comparison module 122 sets a count value N (e.g. N=6) at a position at which a new beacon signal is detected by using the shadowing follow-up counter table 122b, and executes such management that even if a new beacon signal occurs within a predetermined time, the occurrence of such a new beacon signal is not regarded as the occurrence of a new beacon signal. Thereby, the influence of shadowing is reduced.

Figure 21:
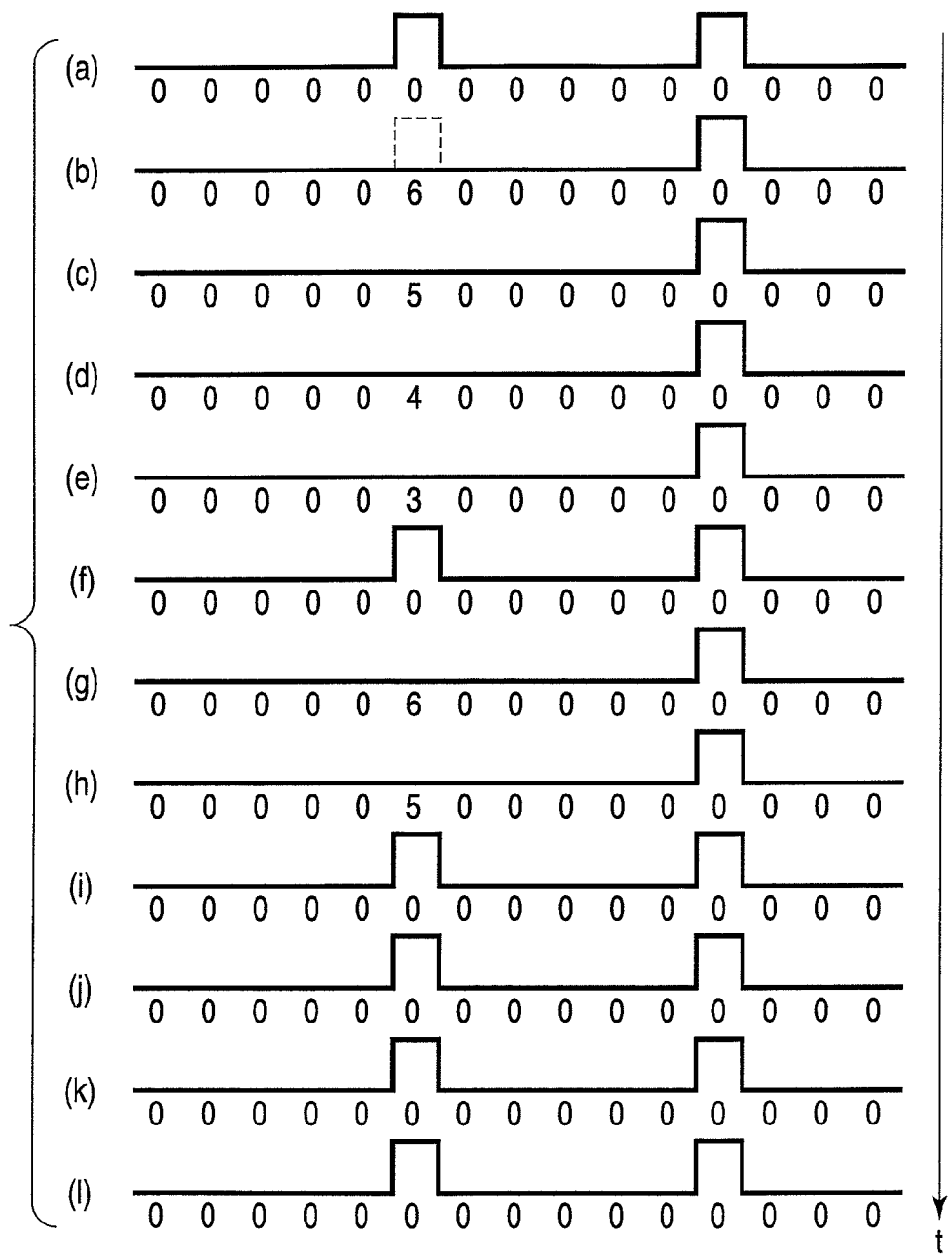
FIG. 21 is an exemplary view for explaining the detection of the new beacon signal by the search result comparison module in the embodiment.

A concrete description is given below. In block 7f, the search result comparison module 122 sets a count value "6" at a loss position of the shadowing follow-up counter table 122b. Parts (a) to (l) of FIG. 20 and parts (a) to (l) of FIG. 21 show examples of a transition of search results.

It is now assumed that a threshold "3" is set for the count value of the shadowing follow-up counter table 122b. Specifically, when a new beacon signal has been detected before the count value is changed from 3 to 2, the count value at this position is initialized, as has been described in connection with the lost beacon signal detection process P1.

Part (a) of FIG. 20 shows that beacon signals have been detected at two positions. When the reception condition of part (a) of FIG. 20 has transitioned to the reception condition of part (b) of FIG. 20, that is, when it is determined that the beacon signal, which has been detected at the left-side position, is lost, the search result comparison module 122 sets a count value "6" at the loss position. It is assumed that a count value "0" is preset at the other positions.

As illustrated in part (j) of FIG. 20, if a beacon signal has been detected when the count value is 0, the search result comparison module 122 outputs an ON signal for activating the wireless module 200.

As shown in parts (c) to (h) of FIG. 20, when the beacon signal remains lost at the position at which the beacon signal was lost, the count value is decremented to 0. As shown in part (j) of FIG. 20, when a new beacon signal has been detected when the count value is 0, the search result comparison module 122 determines that a new stable beacon, which is free from the influence of shadowing, has been detected.

Part (a) of FIG. 21 shows that beacon signals have been detected at two positions. When the reception condition of part (a) of FIG. 21 has transitioned to the reception condition of part (b) of FIG. 21, that is, when it is determined that the beacon signal, which has been detected at the left-side position, is lost, the search result comparison module 122 sets a count value "6" at the loss position. It is assumed that a count value "0" is preset at the other positions.

In a search illustrated in parts (c) to (e) of FIG. 21, since the beacon signal remains lost at the loss position, the search result comparison module 122 successively decrements the count value of this position.

In a subsequent search illustrated in part (f) of FIG. 21, a beacon signal is detected at the loss position. At this time, the counter value is "3" which is not greater than the preset threshold "3" (in the case where "3" is changed to "2"). Thus, the search result comparison module 122 determines that the new beacon signal has been detected, and initializes the count value. Then, if a new beacon signal is detected in a search illustrated in part (i) of FIG. 21, since the count value is greater than the threshold, the count value is initialized. Subsequently, in searches illustrated in parts (j) to (l) of FIG. 21, if beacon signals are detected at the same position, the count value remains "0".

Thus, in block 7f, the count value is set at the position ("loss position") at which the lost beacon signal is detected. Even if the beacon signal is detected once again before the count value is counted to the preset threshold, it is possible to prevent the wireless module 200 from being activated. If the beacon signal is detected once again after the count value is counted to the threshold or less, it can be determined that a new beacon, which is stable and free from the influence of shadowing, has been detected. If the search result comparison module 122 detects a new beacon signal, the search result comparison module 122 outputs an ON signal for activating the wireless module 200, so that a nearby base station search, which will be described later, may be executed.

Next, in block 7g, based on the above-described lost beacon signal detection process P1 and new beacon signal detection process P2, the search result comparison module 122 determines whether the service area has changed. Specifically, the search result comparison module 122 determines whether the mobile wireless terminal apparatus 10 has been moved out of the service area, by detecting the loss of the beacon signal by the lost beacon signal detection process P1, or determines whether the mobile wireless terminal apparatus 10 has been moved into a new service area, by detecting a new beacon signal by the new beacon signal detection process P2.

In block 7g, the low-power-consumption wireless module 100 (search result comparison module 122) determines whether the service area has changed, based on the comparison result in block 7f. Specifically, the low-power-consumption wireless module 100 (search result comparison module 122) determines whether the loss of the beacon signal has been detected, or whether a new beacon signal has been detected. At this time, as described above, it may be determined whether the number of beacons coincides or not.

If the loss of the beacon signal has been detected and the movement to the outside of the service area has been determined, the process advances to block 7h. If a new beacon signal has been detected and the change of the service area has been determined, the process advances to block 7j. If it is determined that the service area has not changed (the reception timing or the number of beacons agrees), the process goes to block 7c.

In block 7j, if a new beacon signal has been detected (or the number of beacons has increased) in the comparison of block 7f, the low-power-consumption wireless module 100 (search result comparison module 122) regards the mobile wireless terminal apparatus 10 as having moved to a new service area, and advances to block 7l. On the other hand, if a new beacon signal has not been detected, the low-power-consumption wireless module 100 (search result comparison module 122) regards the mobile wireless terminal apparatus 10 as not having moved to a new service area, and advances to block 7k.

In block 7k, the low-power-consumption wireless module 100 (search result comparison module 122) updates the past search result storage list L1 by the present search result storage list L2, and goes to block 7c. Thereby, the past search result storage list L1 stores the reception timing of the signal indicated in the reception profile ((d) in FIG. 5 or (e) in FIG. 6) of the present search result storage list L2.

In block 7l, the low-power-consumption wireless module 100 (search result comparison module 122) updates the past search result storage list L1 by the present search result storage list L2, and goes to block 7m. Thereby, the past search result storage list L1 stores the reception timing of the signal indicated in the reception profile ((d) in FIG. 5 or (e) in FIG. 6) of the present search result storage list L2. Then, the search result comparison module 122 notifies the host instruction module 123.

In block 7m, the low-power-consumption wireless module 100 (host instruction module 123) notifies the main control module to activate the wireless module 200, and advances to block 7n. Thereby, the main control module 500 stops power supply to the low-power-consumption wireless module 100 and halts the operation of the low-power-consumption wireless module 100, and the main control module 500 starts power supply to the wireless module 200 and activates the wireless module 200.

In this case, when the main control module 500 is in the inoperative state (halt state or hibernate state), the main control module 500 transitions to the operative state upon receiving the notification. In addition, responding to the notification, the main control module 500 halts the low-power-consumption wireless module 100 (stop of power supply) and, instead, activates the wireless module 200. In the meantime, the low-power-consumption wireless module 100 may be configured to autonomously stop its operation, without the intervention of the main control module 500, if the wireless module 200 is activated.

In block 7n, the wireless module 200 receives beacon signals which are transmitted from respective base stations 12, decodes each beacon signal, and detects the SSID (Service Set Identifier) included in the beacon signal, i.e. the identification information of the base station 12. Thereby, a base station 12, which is located near the mobile wireless terminal apparatus, is detected, the result of the detection is notified to the main control module 500, and the process advances to block 7o.

In block 7o, based on the SSID which is notified from the wireless module 200, the main control module 500 determines whether a usable base station 12 (e.g. base station 12 which provides subscription services) is present nearby. If the usable base station 12 is present nearby, the process advances to block 7r. If the usable base station 12 is not present nearby, the process advances to block 7p.

In block 7r, the main control module 500 displays on the display module 300 the SSID of the base station 12 which has been determined to be usable in block 7o (block 7q), and effects display to inquire of the user as to whether a connection may be established to the base station 12 of this SSID. The main control module 500 determines whether the user has input a permission of the connection through the input module 400 (block 7r). When the input of the user's permission of the connection has been detected, the process goes to block 7s. On the other hand, when the input of the user's permission of the connection has not been detected, the process goes to block 7p. In this case, an automatic connection may be executed by the user setting.

In block 7p, the main control module 500 stops power supply to the wireless module 200 and halts the operation of the wireless module 200, and instead, starts power supply to the low-power-consumption wireless module 100 and activates the low-power-consumption wireless module 100. Then, the process goes to block 7c.

In this manner, when it is determined that the mobile wireless terminal apparatus 10 has moved into the new service area, based on the search by the low-power-consumption wireless module 100, the mobile wireless terminal apparatus 10 activates the wireless module 200 and acquires the SSID of the base station 12, and can display the SSID on the display module 300. Accordingly, at each of the points P1 and P2 shown in FIG. 12, the display on the display module 300 is switched to the display of the SSID of the new service area.

When the process has advanced to block 7p, the base station 12 is not usable, or the connection to the base station 12 is not permitted by the user. Thus, in block 7p, the SSID of the base station 12 may be stored for a time period which is preset by the main control module 500. If the process of block 7o is executed once again within this time period, it may be determined in block 7o that the base station 12 is not usable, based on the stored SSID. In addition, in order to prevent the wireless module 200 from being activated once again by the same base station 12 which is not usable, the past search result storage list is updated in block 7l.

Further, the main control module 500 detects the reception timing of the stored SSID, based on the cumulative addition result of the reception profile, which is obtained by the low-power-consumption wireless module 100, and the SSID received by the wireless module 200, and the main control module 500 notifies the low-power-consumption wireless module 100 of this reception timing. In the subsequent block 7c, the low-power-consumption wireless module 100 may be configured to execute no search at the timing of a predetermined period including the reception timing notified by the main control module 500. Thereby, the period of an unnecessary search by the low-power-consumption wireless module 100 is suppressed, and further reduction in power consumption can be achieved.

On the other hand, in the case where in block 7g the loss of the beacon signal has been detected and the movement to the outside of the service area has been determined (block 7h), if the SSID acquired from the base station 12 of the new service area is displayed on the display module 300 (block 7q), the main control module 500 deletes the display of this SSID (block 7i). Hence, at point P3 shown in FIG. 12, the display of the SSID acquired from the base station 12 of the service area SA2 can be deleted at the timing when the mobile wireless terminal apparatus 10 has moved out of this service area SA2.

When there are a plurality of base stations whose SSIDs are displayed prior to block 7i, or if SSIDs of a plurality of base stations are acquired by a search immediately prior to block 7i, the mobile wireless terminal apparatus 10 activates the wireless module 200 and acquires SSIDs, and displays, among the acquired SSIDs, an SSID of a usable base station 12 on the display module 300. Specifically, when the number of beacons detected in the search of block 7c is one or more, the mobile wireless terminal apparatus 10 acquires SSIDs by activating the wireless module 200, determines a base station which had transmitted a beacon that is no longer received (a base station whose beacon was lost), and deletes the display of the SSID of the base station whose beacon was lost. On the other hand, in block 7i, if the number of beacons received in block 7c is 1, the display of the SSID of the base station corresponding to the beacon may be deleted. Thereby, the mobile wireless terminal apparatus 10 deletes the display of the SSID of the base station whose beacon signal was detected as being lost.

In block 7s, the main control module 500 controls the wireless module 200, and instructs the wireless module 200 to establish a connection to the usable base station 12. Responding to the instruction, the wireless module 200 executes wireless communication with the usable base station 12 according to a predetermined protocol, establishes a communication link, and finishes the process.

As has been described above, in the mobile wireless terminal apparatus having the above-described structure, the low-power-consumption wireless module 100, which does not have the function of decoding a reception signal and is lower in power consumption than the wireless module 200, monitors the reception profile (reception timing) of the beacon signal. If the reception timing of the beacon signal varies, the low-power-consumption wireless module 100 determines that the mobile wireless terminal apparatus has moved to a new service area, activates the wireless module 200 whose operation has been halted, searches for a connectable base station 12, and establishes a connection after the confirmation by the user. If a connectable base station 12 is not found (out of the subscription service area) or if the user refuses to connect, the wireless module 200 is halted once again.

Accordingly, in the mobile wireless terminal apparatus 10 having the above-described structure, at the wait time, the low-power-consumption wireless module 100, which is lower in power consumption than the wireless module 200 is configured to operate. Thus, the power consumption for searching the base station 12 can be reduced, and the variation of the service area (e.g. coming back home, moving from home, moving into a Hotspot, etc.) can continuously be searched. Therefore, degradation in convenience for the user can be prevented.

In addition, in the mobile wireless terminal apparatus 10, the low-power-consumption wireless module 100 determines the movement into a new service area or the movement out of the service area, and controls (refreshes) the display of the SSID which is acquired from the base station 12. Therefore, the display of the proper SSID corresponding to the present position of the mobile wireless terminal apparatus 10 can be realized with low power consumption.

In the above-described embodiment, the beacon transmission cycle (102.4 ms) is used as the search window, and the entirety of the search window is searched. Alternatively, a part of the search window may be searched. For example, the comparator 114 and beacon detection module 121 may be configured to execute no processing with respect to the timing at which a beacon signal cannot be received over a preset time, based on the cumulative result of the cumulative processing module 121b or the determination result of the threshold determination module 121c, or may be configured to execute processing with respect to only the timing within a predetermined range including the timing at which a beacon signal has been received over a preset time. Thereby, since the time for the reception process can be reduced, the power consumption can be reduced.

The above-described range is determined in consideration of the maximum amount of the error occurring due to the cumulative addition. After the search period is decreased for a predetermined time, the process of searching the entire search window may be restored. By the periodical restoration to this process, the movement to the new service area can be detected even when the user moves.

In the above description of the embodiment, the low-power-consumption wireless module 100 stores and compares the past search result storage list L1 and present search result storage list L2. However, the main control module 500 may execute these processes.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile wireless terminal apparatus configured to wirelessly communicate with a base station, the apparatus comprising:
a first communication module configured to detect a beacon signal from a wireless signal transmitted from the base station to a service area, and to determine movement into a new service area and movement to an outside of the service area, based on a variation of a reception timing of the beacon signal;
a second communication module configured to receive a wireless signal transmitted from the base station and to communicate with the base station by acquiring identification information of the base station from the wireless signal, the second communication module being greater in power consumption than the first communication module; and
a controller configured to activate the second communication module and cause the second communication module to acquire the identification information, when the movement to the new service area is determined by the first communication module;
wherein the first communication module comprises:
a beacon detection module configured to generate a plurality of reception profiles, each profile indicative of the reception timing of the wireless signal in a search window corresponding to a first cycle, to add wireless signals received at the same timing by overlapping the plurality of reception profiles, and to detect reception timings of the beacon signal by detecting added wireless signals exceeding a first value; and
a comparison module configured to:
compare a first list, comprising the first reception timing detected at a first timing, and a second list, comprising the second reception timing detected at a second timing after the first timing;
and
determine the movement into the new service area and the movement to the outside of the service area, based on a difference between the first reception timing and the second reception timing.

2. The mobile wireless terminal apparatus of claim 1, further comprising a display configured to display information, wherein the controller is configured to cause the display to display the identification information received by the second communication module.

3. The mobile wireless terminal apparatus of claim 2, wherein the controller is configured to delete the identification information displayed on the display when the movement to the outside of the service area is determined by the first communication module.

4. The mobile wireless terminal apparatus of claim 2, wherein the controller is configured to activate the second communication module, and to cause the second communication module to acquire the identification information, when the movement to the outside of the service area is determined by the first communication module.

5. The mobile wireless terminal apparatus of claim 1, wherein the comparison module is configured to detect when the reception timing of the beacon signal is lost by comparing the first list and the second list, and to a time of loss of the reception timing of the beacon signal in a counter table, wherein the comparison module is configured to initialize the counter table when a new reception timing is detected before a count value in the counter table reaches a first value.

6. The mobile wireless terminal apparatus of claim 5, wherein the comparison module is configured to initialize the count value of the counter table corresponding to the reception timings, when the reception timings partly overlap in the comparison of the first list and the second list.

7. A base station search method of a mobile wireless terminal apparatus configured to wirelessly communicate with a base station in a network, the method comprising:

detecting, at a first communication module, a beacon signal from a wireless signal transmitted from the base station to a service area;

generating a plurality of reception profiles, each profile indicative of the reception timing of the wireless signal in a search window corresponding to a first cycle;

adding wireless signals received at the same timing by overlapping the plurality of reception profiles;

detecting reception timings of the beacon signal by detecting added wireless signals exceeding a first value;

comparing a first list, comprising the first reception timing detected at a first timing, and a second list, comprising the second reception timing detected at a second timing after the first timing;

determining movement to a new service area and movement to an outside of the service area, based on a difference between the first reception timing and the second reception timing;

activating a second communication module having a greater power consumption than the first communication module, when the movement to the new service area is determined by the first communication module;

receiving, at the second communication module, a wireless signal transmitted from the base station; and acquiring identification information of the base station.

* * * * *